(12) United States Patent
Tell

(10) Patent No.: US 8,964,919 B2
(45) Date of Patent: Feb. 24, 2015

(54) SYSTEM AND METHOD FOR DETERMINING A TIME FOR SAFELY SAMPLING A SIGNAL OF A CLOCK DOMAIN

(71) Applicant: NVIDIA Corporation, Santa Clara, CA (US)

(72) Inventor: Stephen G. Tell, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 72 days.

(21) Appl. No.: 13/674,864

(22) Filed: Nov. 12, 2012

(65) Prior Publication Data

US 2013/0070880 A1    Mar. 21, 2013

Related U.S. Application Data

(63) Continuation-in-part of application No. 12/957,262, filed on Nov. 30, 2010, now Pat. No. 8,428,207.

(60) Provisional application No. 61/265,280, filed on Nov. 30, 2009.

(51) Int. Cl.
*H04L 7/00* (2006.01)
*G06F 5/10* (2006.01)
*G06F 7/499* (2006.01)

(52) U.S. Cl.
CPC ............... *H04L 7/0012* (2013.01); *H04L 7/005* (2013.01); *G06F 5/10* (2013.01); *G06F 7/49989* (2013.01); *G06F 2205/106* (2013.01)
USPC ........... 375/355; 375/354; 375/375; 375/376; 375/371

(58) Field of Classification Search
CPC ......... H04L 7/0012; H04L 7/005; G06F 5/10; G06F 7/49989; G06F 2205/106
USPC .......... 375/355, 354, 375, 376, 371; 327/159, 327/158, 536
See application file for complete search history.

(56) References Cited

U.S. PATENT DOCUMENTS 8,311,176 B2 * 11/2012 Lee et al. ....................... 375/375
2003/0183842 A1    10/2003 Kizer et al.

(Continued)

OTHER PUBLICATIONS

Notice of Allowance from U.S. Appl. No. 12/957,262 dated Feb. 8, 2013.

(Continued)

*Primary Examiner* — Dhaval Patel
(74) *Attorney, Agent, or Firm* — Zilka-Kotab, PC

(57) ABSTRACT

A system and method are provided for determining a time for safely sampling a signal of a clock domain. In one embodiment, a phase estimate of a first clock domain is calculated based on a relative frequency estimate between a second clock domain and the first clock domain and, based on the phase estimate, a first time during which a signal from the first clock domain is unchanging such that the signal is capable of being safely sampled by the second clock domain is determined to generate a first sampled signal in the second clock domain. Additionally, an updated phase estimate is calculated, and, based on the updated phase estimate, a second time during which the signal from the first clock domain is changing such that the signal is not capable of being safely sampled by the second clock domain is determined. During the second time the first sampled signal in the second clock domain is maintained.

20 Claims, 26 Drawing Sheets

(56) References Cited

U.S. PATENT DOCUMENTS

| | | | |
|---|---|---|---|
| 2007/0105525 A1 | 5/2007 | Wang et al. | |
| 2009/0278577 A1 | 11/2009 | Yoon et al. | |
| 2010/0049887 A1 | 2/2010 | Williams et al. | |
| 2010/0322365 A1* | 12/2010 | Dobkin et al. | 375/354 |
| 2013/0216013 A1 | 8/2013 | Dally et al. | |

OTHER PUBLICATIONS

Non-Final Office Action from U.S. Appl. No. 13/849,414 dated Jul. 19, 2013.

Dally, W. J. et al., The Even/Odd Synchronizer: A Fast, All-Digital, Periodic Synchronizer, 2010 IEEE Symposium on Asynchronous Circuits and Systems, IEEE Computer Society, May 3-6, 2010, pp. 75-84.

Dally, W. J. et al., Digital Systems Engineering, Cambridge University Press, 1998, pp. 482-487.

Stewart, W. K., A Solution to a Special Case of the Synchronization Problem, Thesis, Jun. 1983, Massachusetts Institute of Technology, pp. 1-20.

Stewart, W. K. et al., A Solution to a Special Case of the Synchronization Problem, IEEE Transactions on Computers, vol. 37, No. 1, Jan. 1988, pp. 123-125.

Dennison, L. R. et al., Low-Latency Plesiochronous Data Retiming, Proceedings of the Sixteenth Anniversary Conference on Advanced Research in VLSI, 1995, pp. 304-315.

Frank, U. et al., A predictive synchronizer for periodic clock domains, Journal of Formal Methods in System Design, vol. 28, Issue 2, Mar. 2006, pp. 171-186.

Sarmenta, L. F. G. et al., Rational Clocking, Proceedings of the IEEE International Conference on Computer Design, Oct. 2-4, 1995, pp. 271-278.

Chakraborty, A. et al., Efficient Self-Timed Interfaces for Crossing Clock Domains, Proceedings of the Ninth International Symposium on Asynchronous Circuits and Systems, May 12-15, 2003, pp. 78-88.

Non-Final Office Action from U.S. Appl. No. 12/957,262, dated Oct. 19, 2012.

Final Office Action from U.S. Appl. No. 13/849,414, dated Dec. 30, 2013.

Advisory Action from U.S. Appl. No. 13/849,414, dated Mar. 10, 2014.

Notice of Allowance from U.S. Appl. No. 13/849,414, Jul. 11, 2014.

\* cited by examiner

SYSTEM AND METHOD FOR DETERMINING A TIME FOR SAFELY SAMPLING A SIGNAL OF A CLOCK DOMAIN

CLAIM OF PRIORITY

This application is a continuation-in-part of U.S. application Ser. No. 12/957,262, filed Nov. 30, 2010, which claims the benefit of U.S. Provisional Application No. 61/265,280, filed Nov. 30, 2009. The entire contents of these applications are incorporated herein by reference.

FIELD OF THE INVENTION

The present invention relates to signals transmitted between clock domains, and more particularly to synchronizing clock domains.

BACKGROUND

Many digital systems have multiple clock domains. Thus, when signals move from one clock domain to another, they must be synchronized to avoid metastability and synchronization failure. If the two clocks have fixed frequencies, the phase relationship between the two clocks is periodic, at the beat frequency of the two clocks. By taking advantage of this periodic phase relationship, a periodic synchronizer can be simpler, have lower latency, and a lower probability of failure than a synchronizer that has to handle completely asynchronous signals.

Unfortunately, traditional periodic synchronizers exhibit various limitations. For example, most existing systems' signals are synchronized with a periodic clock using asynchronous first-in-first outs (FIFOs). These incur a significant area overhead for the FIFO memory. They also add several cycles of delay as the Gray-coded input and output pointers of the FIFO must be synchronized through multiple flip-flops to move them across clock domains.

There is thus a need for addressing these and/or other issues associated with the prior art.

SUMMARY

A system and method are provided for determining a time for safely sampling a signal of a clock domain. In one embodiment, a phase estimate of a first clock domain is calculated based on a relative frequency estimate between a second clock domain and the first clock domain and, based on the phase estimate, a first time during which a signal from the first clock domain is unchanging such that the signal is capable of being safely sampled by the second clock domain is determined to generate a first sampled signal in the second clock domain. Additionally, an updated phase estimate is calculated, and, based on the updated phase estimate, a second time during which the signal from the first clock domain is changing such that the signal is not capable of being safely sampled by the second clock domain is determined. During the second time the first sampled signal in the second clock domain is maintained.

DETAILED DESCRIPTION

Table 1 illustrates various symbols and signal names referenced in the descriptions of the figures hereinbelow, in addition to exemplary values for at least some of such symbols and signal names.

TABLE 1

| Symbol | Description | Units | Typ |
|---|---|---|---|
| A | Advance in the phase estimator, A = S + 1 | cycles | 5 |
| b | Fraction bits in the frequency and phase estimates | bits | 12 |
| C | Upper bound on denominator D, C = [½d] | | 8 |
| d | Half-width of phase detection region, d = $t_d/t_{rcy}$ | UI | 0.098 |
| D | Denominator of a rational fraction N/D. | | |
| e | Difference from "nearest" rational fraction, f = N/D + e | | |
| f | Relative fractional transmit clock frequency, f = $f_T/f_R$ mod 1. (For purposes of keeping even and odd cycles, we keep f mod 2.) | UI/Cycle | |
| $f_g$ | Guard-band frequency ($f_g$ = g/A), the frequency below which a detection will occur at least A cycles before a keep-out event | UI/Cycle | 0.03 |
| $f_j$ | Jitter frequency. | | |
| $f_R$ | Receive clock (rclk) frequency | Hz | 1e9 |
| $f_T$ | Transmit clock (tclk) frequency | Hz | 7.5e8 |
| g | Guard band between detection and keep-out regions, g = d − x | UI | 0.075 |
| k | Threshold for entering plesiochronous mode, i.e. we enter plesiochronous mode when \|pu − pu\| > k | UI | 0.50 |
| N | Numerator of a rational fraction N/D. | | |
| φ | Phase | UI | |
| p | Estimated phase | UI | |
| S | Synchronizer delay | Cycles | 4 |
| $t_d$ | Delay time used in phase detector | ps | 130 |
| $t_{jh}$ | Bound on absolute value of high-frequency jitter (jitter with $f_j > f_r/A$). Peak-to-peak jitter is twice this value. | ps | 30 |
| $t_{jm}$ | Bound on absolute value of medium-frequency jitter (jitter with $f_g f_r < f_j < f_r/A$) | ps | 10 |
| $t_{rcy}$ | Receive clock (rclk) cycle time | ps | 1000 |
| $t_{tcy}$ | Transmit clock (tclk) cycle time | ps | 1333 |
| $t_x$ | Keep-out time ($t_x = t_s + t_h + t_{jh}$) | ps | 60 |
| x | Half-width of keepout region (UI), x = $t_x/2t_{rcy}$ | UI | 0.023 |

Additionally, examples of the various embodiments included hereinbelow are described in "The Even/Odd Synchronizer: A Fast, All-Digital, Periodic Synchronizer," by William J. Daily and Stephen G. Tell, Asynchronous Circuits and Systems, International Symposium on, pp. 75-84, 2010 IEEE Symposium on Asynchronous Circuits and Systems, 2010, which is herein incorporated by reference in its entirety.

Figure 1:
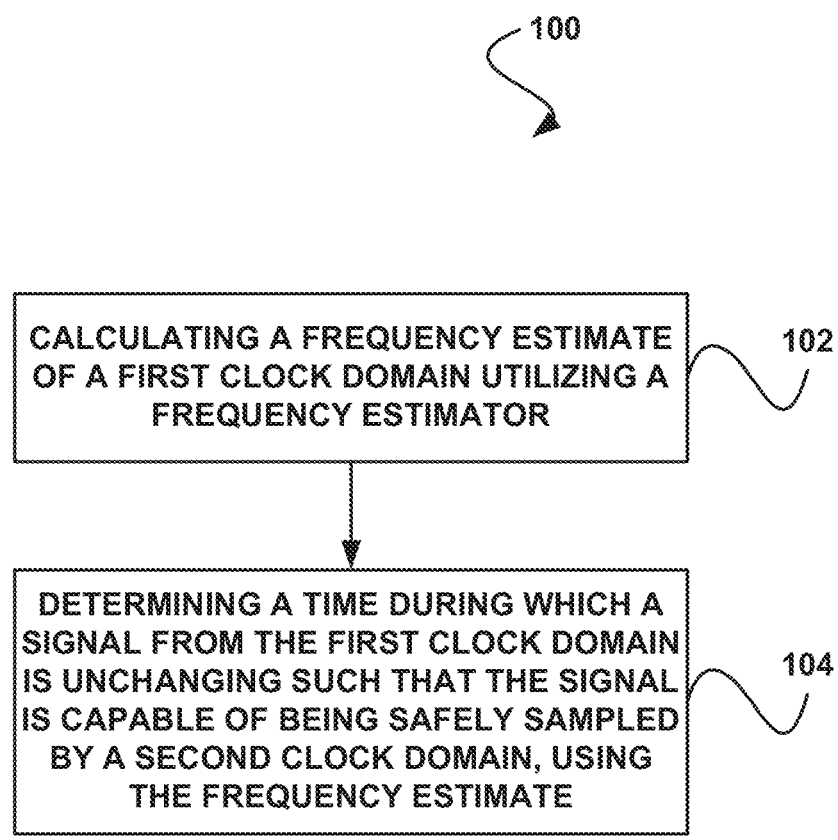
FIG. 1 illustrates a method for determining a time for safely sampling a signal of a clock domain using a frequency estimate, in accordance with one embodiment.

FIG. 1 illustrates a method 100 for determining a time for safely sampling a signal of a clock domain using a frequency estimate, in accordance with one embodiment. As shown in operation 102, a frequency estimate of a first clock domain is calculated utilizing a frequency estimator. With respect to the present description, the first clock domain may include a clock domain (e.g. a clock with a particular frequency) of any type of system from which a signal may be sampled. For example, the first clock domain may include a clock domain of a central processing unit (CPU), a graphics processing unit (GPU), a memory controller, and/or any other system with a clock domain.

As noted above, the first clock domain may include the clock of the system. Further, the clock domain may operate (e.g. transmit signals) at a particular frequency. To this end, the frequency estimate of the first clock domain may include an estimate (e.g. measure, etc.) of the frequency of the clock of the system.

In one embodiment, the frequency estimate may be calculated utilizing a pair of b-bit counters. For example, a first one of the counters (hereinafter referred to as the first counter) may be clocked by the first clock domain and may count pulses of the clock in the first clock domain. Further, a second one of the counters (hereinafter referred to as the second counter) may count pulses of a clock in a second clock domain desiring to sample a signal from the first clock domain, and may be clocked by the second clock domain. It should be noted that the second clock domain may include a clock domain of a system by which the signal of the first clock domain may be sampled, and therefore that is different from the system associated with the first clock domain. For example, the frequency of the first clock domain may be different from the frequency of the second clock domain.

When the second counter reaches its terminal count, the first counter may be stopped. In this way, the time the first counter is counting pulses may be equal to the time taken by the second counter to reach the terminal count. The count of the first counter may then be recorded in a register. Such first count may indicate the frequency estimate of the first clock domain.

In another embodiment, the frequency estimate may be calculated without measuring the frequency of each of the first clock domain and the second clock domain. In such embodiment, the first clock domain and the second clock domain may have frequencies that differ by a rational number. For example, the frequency of the first clock domain may equal the frequency of the second clock domain multiplied by N/D where N and D are integers. Thus, for integers N and D, the frequency estimate may be calculated as N divided by D (N/D).

The frequency estimator utilized for calculating the frequency estimate may be included in a synchronizer. For example, the synchronizer may be implemented between the system associated with the first clock domain and the system associated with the second clock domain for synchronizing signals between the first clock domain and the second clock domain (e.g. for synchronizing the sampling of the signal by the second clock domain from the first clock domain). As described below, such synchronization may be performed based on the calculated frequency estimate.

Furthermore, as shown in operation 104, a time during which a signal from the first clock domain is unchanging is determined such that the signal is capable of being safely sampled by a second clock domain, using the frequency estimate. For example, the time during which a signal from the first clock domain is unchanging may include a phase of the first clock domain during which the signal from the first clock domain is unchanging (e.g. static, etc.). As another example, the time during which a signal from the first clock domain is unchanging may include any time period outside of a detection range associated with a clock edge of the first clock domain. For example, it may be known that the signal changes in synchrony with the edges of the clock of the first clock domain. Thus, the detection range may include a combination of a first period of time before a clock edge of the first clock domain and a second period of time after the clock edge of the first clock domain.

In one embodiment, the time during which the signal from the first clock domain is unchanging may be determined based on identification of the first clock domain and the second clock domain as being rationally related. The rational relationship may result from the frequency of the first clock domain and the frequency of the second clock domain both being generated from a common crystal reference frequency by phase-locked-loops (PLLs) that divide down a reference frequency and then multiply up.

In another embodiment, upon identification of the first clock domain and the second clock domain as being rationally related, it may automatically be determined that the phase of the first clock domain is unchanging (and thus cannot be detected) or is slowly varying. Thus, the time during which a signal from the first clock domain is unchanging may be determined without necessarily utilizing an estimate of the phase of the first clock domain (e.g. thus utilizing only the frequency estimate of the first clock domain).

For example, the phase may be represented as P=a·b/D, where 'a' is an integer part, 'b' is a fractional part and D is the denominator of a rational relative frequency. In this way, the phase may be detected and upper (up) and lower (lp) bounds may be initialized to the bounds of the detection region scaled by D, as described above. In one embodiment, a first detection may initialize the phase bounds (up and lp). The D relative phases may be repeatedly visited, at least one of which is expected to cause a detection (and hence detect a possible conflict). After D+1 cycles without detection, it may be determined that all D relative phases between the two clocks do not cause conflicts, such that the time during which a signal from the first clock domain is unchanging may be determined, such that the signal is capable of being safely sampled by the second clock domain.

Figure 2:
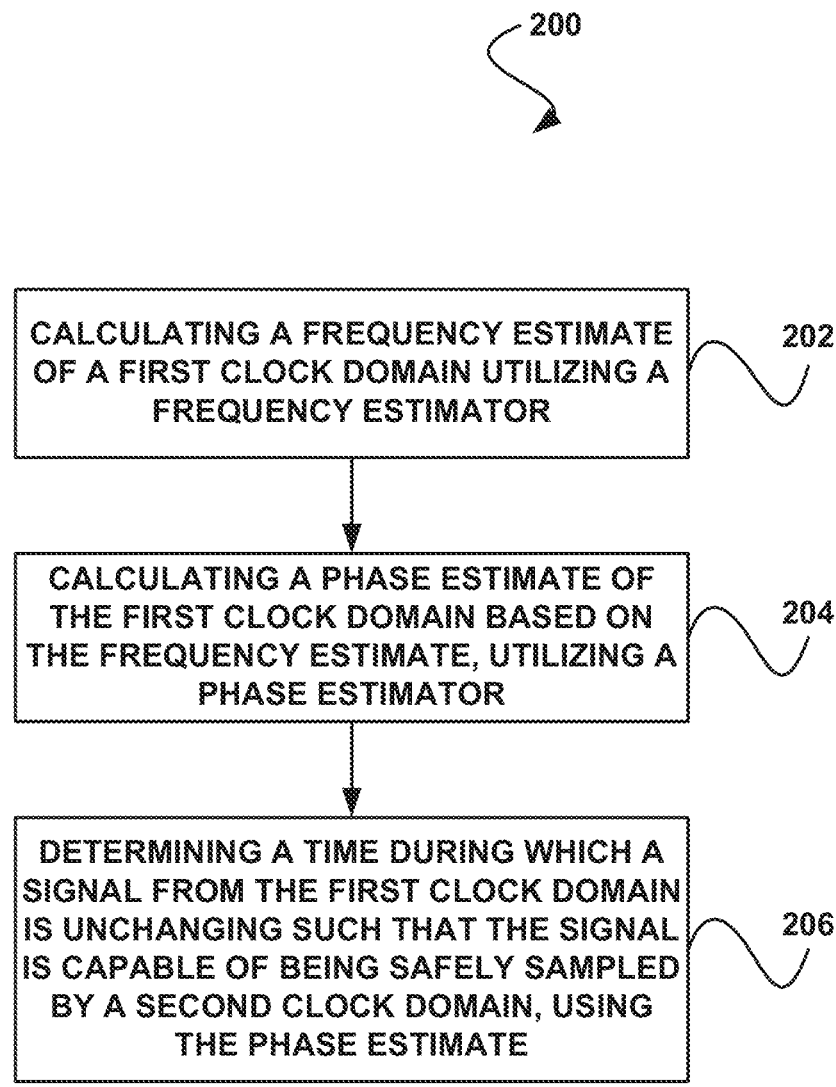
FIG. 2 illustrates a method for determining a time for safely sampling a signal of a clock domain using a phase estimate, in accordance with another embodiment.

FIG. 2 illustrates a method for determining a time for safely sampling a signal of a clock domain using a phase estimate, in accordance with another embodiment. As shown in operation 202, a frequency estimate of a first clock domain is calculated utilizing a frequency estimator. With respect to the present description, the frequency estimate may be calculated in the manner described above with respect to operation 102 of FIG. 1.

Further, as shown in operation 204, a phase estimate of the first clock domain is calculated based on the frequency estimate, utilizing a phase estimator. In one embodiment, a phase of the first clock domain may be detected. For example, early and late samples may be from the first clock domain relative to the second clock domain.

The early and late samples may include pairs of samples, each pair consisting of an early sample and a late sample. Further, the early and late samples may be of a signal that is synchronized with the first clock domain. If a pair of early and late samples differ, it may be determined that a transition occurred during the detection region (e.g. time) occurring between the time the early and late samples were taken. In this way, a phase of the first clock domain may be detected.

In another embodiment, the phase estimate may be calculated based on the phase detection. For example, a b-bit running estimate of the phase of the first clock domain may be maintained relative to the second clock domain. The phase estimate may be a b-bit fraction that represents values between zero and one around a unit circle. Further, the phase estimate may be reset to indicate that it is safe to sample from the first clock domain each time the phase is detected in the manner described above.

In a further embodiment, upon a detection, the phase of the first clock domain should be set to f(S+1), where an additional cycle is added to S (the delay of the synchronizer) to predict the phase estimate one cycle before it occurs. The phase of the first clock domain described above may be set to f(S+1) so that the phase estimate predicts the phase of the first clock domain at a next rising edge of the second clock domain. For example, the phase estimate may encode the phase within even cycles and odd cycles of the first clock domain. If the phase is not detected, the phase estimate may be incremented by the relative frequency of the first clock domain during each cycle of the second clock domain. To this end, a running phase estimate may be maintained. It should be noted that in addition to the frequency detector, the phase detector and the phase estimator may also be included in a synchronizer. For example, the synchronizer may be implemented between the system associated with the first clock domain and the system associated with the second clock domain for synchronizing signals between the first clock domain and the second clock domain (e.g. for synchronizing the sampling of the signal by the second clock domain from the first clock domain). As described below, such synchronization may be performed based on the calculated phase estimate.

Moreover, as shown in operation 206, a time during which a signal from the first clock domain is unchanging is determined such that the signal is capable of being safely sampled by a second clock domain, using the phase estimate. As noted above, the phase estimate may indicate the time during which it is safe to sample from the first clock domain (i.e. when the signal from the first clock domain is known to be unchanging).

For example, the phase estimate may predict the phase of the first clock domain at a next rising edge of the second clock domain. This may allow a delayed version of the input data to be sampled before the rising edge of the second clock domain samples a direct input that is transitioning in the keep-out region (and thus that may be changing).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
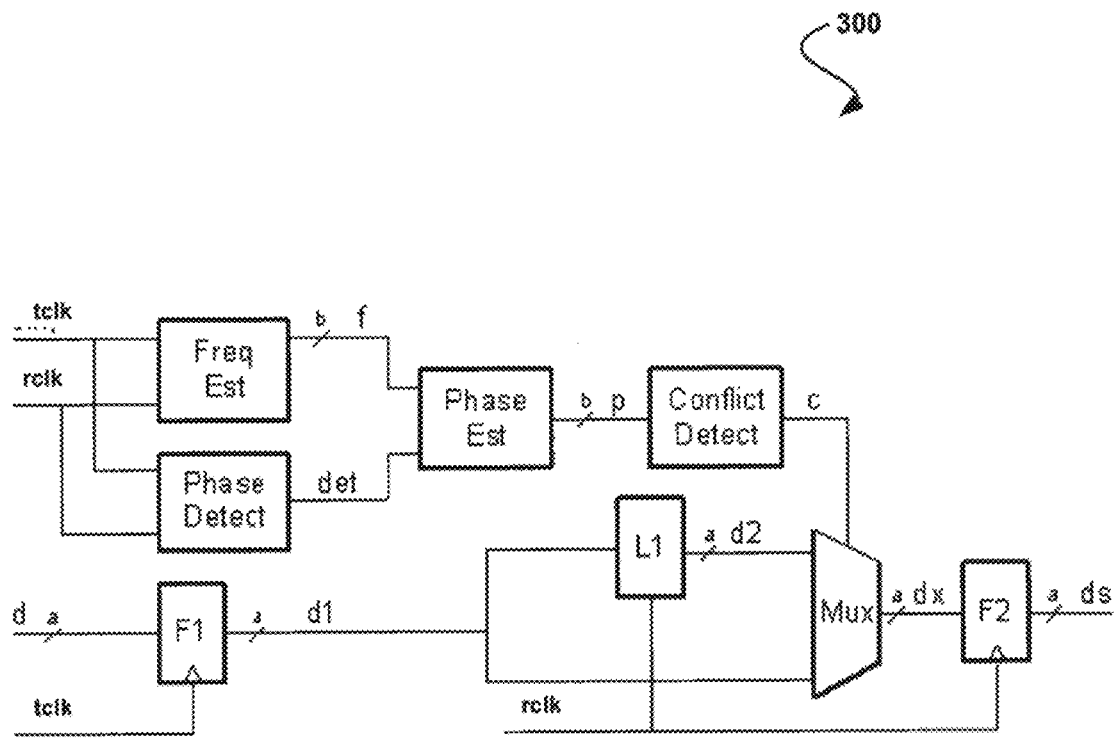
FIG. 3 illustrates an all-digital periodic synchronizer for safely sampling a signal of a clock domain using a phase estimate, in accordance with yet another embodiment.

FIG. 3 illustrates an all-digital periodic synchronizer 300 for safely sampling a signal of a clock domain using a phase estimate, in accordance with yet another embodiment. As an option, the all-digital periodic synchronizer 300 may be implemented to carry out the methods of FIGS. 1 and/or 2. Of course, however, the all-digital periodic synchronizer 300 may be implemented in any desired environment. It should also be noted that the aforementioned definitions may apply during the present description.

An arbitrary periodic signal may be synchronized using entirely digital components by measuring its frequency and phase, and then using this information to determine when it is safe to simply sample the signal with the receiving clock and when direct sampling is unsafe and a delayed clock must be used. By using the frequency and phase, use of FIFO memory may be avoided. In addition, a delay of synchronization may be reduced (e.g. by avoiding synchronizing Grey-coded head and tail pointers through brute-force synchronizers).

If a FIFO synchronizer is utilized for flow control, the synchronizer may be used in place of a brute-force synchronizer (using multiple flip-flops connected in series) to synchronize the FIFO head and tail pointers. This may reduce the delay of the FIFO synchronizer and eliminate use of Gray-code the pointers (which may otherwise require maintaining both Gray-code and binary pointers).

With respect to the present embodiment, an incoming signal, d, may be synchronized to a transmit clock (of a transmit clock domain), tclk, that has a fixed frequency, $f_T$, that is lower than the frequency, $f_R$, of the receive clock, rclk (of a receive clock domain). The embodiments described here also work where $f_T$ is higher than $f_R$.

As shown, a frequency estimation block uses a pair of b-bit counters to measure the frequency of the transmit clock. The frequency estimation block outputs a b-bit relative frequency $f=f_T/f_R \bmod 2f$.

A phase detection block records the last time that the transmit clock entered a detection region of the receive clock. A detect signal (det) is output when this occurs. Because the detection signal is synchronized, it reflects the phase of the transmit clock S receive cycles ago. It should be noted that multiple detection regions and signals may be employed. However, with respect to the present embodiment, a single bit detection signal is assumed.

A phase estimation block keeps a running estimate of the phase of the receive clock. It sets the phase, p, to (S+1)f each time a detection is received and increments the running phase by f each cycle of rclk for which there is no detection.

Finally, a conflict detection block uses the current phase estimate to determine when direct sampling is safe or when delayed sampling is required. When phase, p, is in a window near the danger point, conflict signal c is asserted which directs a multiplexer to sample a delayed version of the plesiochronous input.

The synchronizer datapath accepts an a-bit wide input d1 that is synchronized to tclk. In the figure, d1 is generated by register F1 clocked by tclk. Optionally, register F1 may not necessarily be part of the synchronizer 300. However, signal d1 may come directly from a register with no intervening logic, as another option. Latch L1 (or a flip-flop, not shown) samples signal d1 on the falling edge of rclk to generate delayed input signal d2. A multiplexer selects the direct input, d1, when there is no conflict and the delayed input, d2, when there is a conflict. The result of this selection, dx, is guaranteed to be safe for sampling by register F2 which produces an output, ds, that is synchronous with rclk.

The conflict detection window is set so that sampling is safe on the selected input of the multiplexer. When c is asserted and the multiplexer selects d2, the sampling of signal d1 by latch L1 on the falling edge of rclk is guaranteed to be safe. When c is not asserted, then the sampling of d1 by register F2 on the rising edge of rclk is guaranteed to be safe.

The synchronizer 300 uses latch L1 to delay input d1 by a half cycle (sampling on the falling edge of $clk_R$). Thus, a phase delay of $p_D$=0.5 may be provided. As another option, latches or registers with different timing may be used to delay d1 by different amounts. As yet another option, a delay line (e.g. an even number of inverters in series) may be used to delay signal d1 by a sufficient amount of time to make sampling by register F2 safe. These alternatives may give different values of $p_D$.

Figure 4:
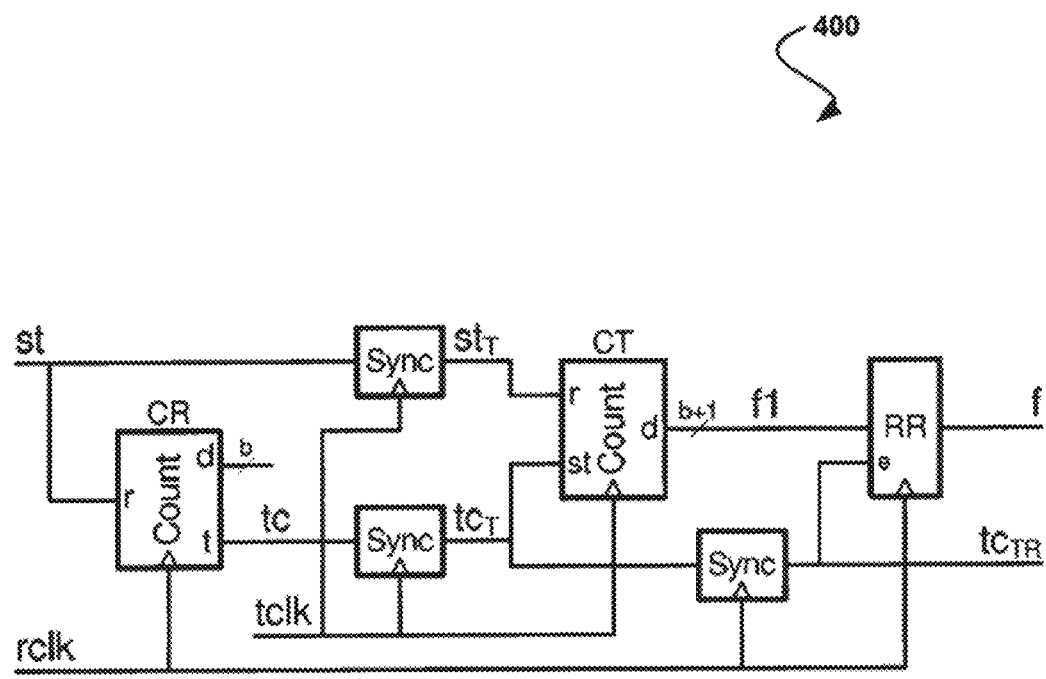
FIG. 4 illustrates a frequency estimator, in accordance with still yet another embodiment.

FIG. 4 illustrates a frequency estimator 400, in accordance with still yet another embodiment. As an option, the frequency estimator 400 may be implemented in the context of the functionality and architecture of FIGS. 1-3. Of course, however, the frequency estimator 400 may be implemented in any desired environment. It should also be noted that the aforementioned definitions may apply during the present description.

The synchronizer of FIG. 3 depends on having an accurate estimate of the transmit clock phase at the end of each receive clock cycle. This estimate is generated by first measuring the relative frequency of the transmit clock (shown in FIG. 3) and then using this frequency estimate, along with a phase detector (shown in FIG. 5E), to generate a phase estimate. The phase estimate is computed using interval arithmetic to maintain an accurate error bound on the phase.

As shown in FIG. 4 the block diagram 400 of the frequency measurement unit is provided which uses a pair of counters to compute f, the frequency of the transmit clock relative to the receive clock. The frequency measurement process is initiated by a start signal, st. The rising edge of st resets the receive counter (CR). The start signal is also passed into the transmit clock (tclk) domain through a brute-force synchronizer, producing signal $st_T$ which is used to reset the transmit counter (CT).

When the receive counter reaches a terminal count (e.g., a count of 1023 for a b=10-bit counter) signal tc is asserted and is synchronized into the tclk domain. This synchronized terminal count signal, $tc_T$, stops the transmit counter. The delay of the sp and tc synchronizers are balanced so that the final count out of CT reflects the number of tclk cycles that occurred during $2^b$ receive clock (rclk) cycles, i.e., the relative frequency of the transmitter, f=$f_T/f_R$. The terminal count signal is synchronized back into the rclk domain to produce signal $tc_{TR}$ which indicates when the frequency measurement f is ready and enables its capture in the result register (RR).

Counter CT produces a b+1 bit result so that f is generated modulo 2. It is a fixed-point number with one bit to the left of the binary point and b bits to the right. The transmit frequency estimate modulo 2 is computed rather than modulo 1 so that the phase estimator (described below with respect to FIG. 5E) can track whether the transmitter is in an odd or even clock cycle.

There are three brute force synchronizers in the frequency measurement block of FIG. 4. These synchronizers are used only once, namely when frequency is measured after reset. All of these synchronizers are off of the critical path, so their delay can be made arbitrarily high to achieve an arbitrarily low probability of synchronization failure. Typically a delay S of four or five clock cycles suffices to give a failure probability of less than $10^{-40}$.

The start signal and terminal count synchronizers each introduce one cycle of uncertainty in the frequency measurement. Hence the output of the frequency measurement block is accurate to ±1 LSB, i.e., ±$2^{-b}$.

Figure 5A:
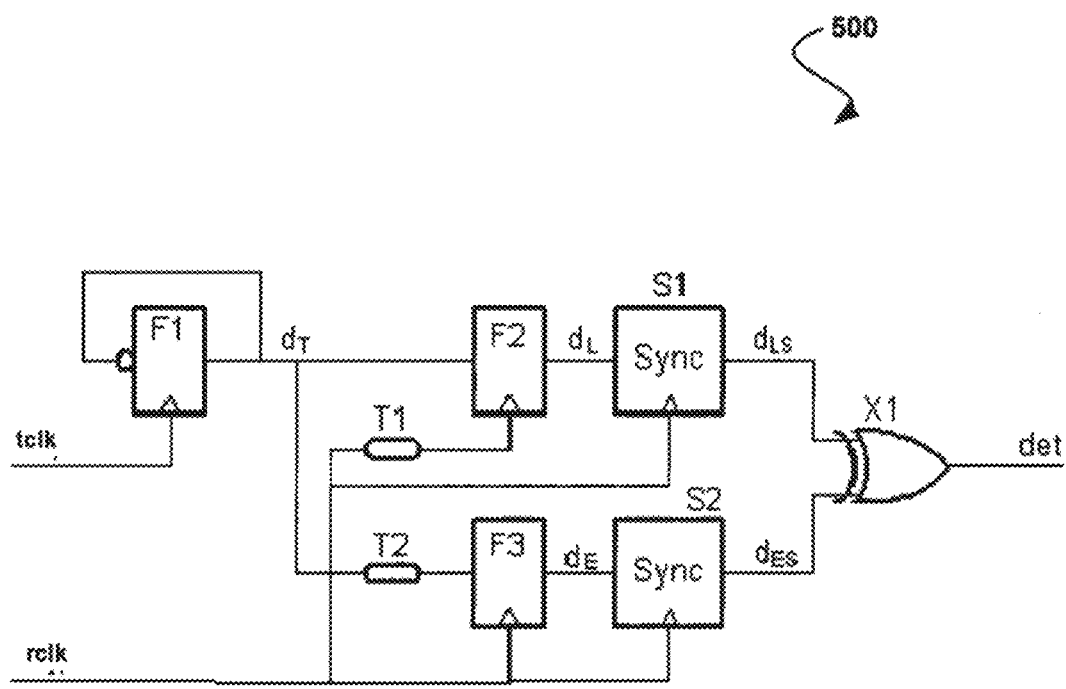
FIG. 5A illustrates a phase detector, in accordance with another embodiment.

FIG. 5A illustrates a phase detector 500, in accordance with another embodiment. As an option, the phase detector 500 may be implemented in the context of the functionality and architecture of FIGS. 1-4. For example, the phase detector may include a component of the phase estimator described above. Of course, however, the phase detector 500 may be implemented in any desired environment. It should also be noted that the aforementioned definitions may apply during the present description.

As shown, the phase detection logic shown with respect to the phase detector 500 operates by taking early and late samples, relative to rclk, of a signal $d_T$ synchronized with tclk. If the early and late samples differ, it is determined that a transition occurred during the detection region. Flip flop F1 generates signal $d_T$ synchronized with tclk that toggles every cycle. Signal $d_T$ is sampled early, relative to rclk, by flip flop F3 and late by flip flop F2. Flip flop F2 is clocked by a version of rclk that is delayed by T1 and thus samples $d_T$ at time T1 after the rising edge of rclk. The result of this late sampling of $d_T$ is signal $d_L$. Flip flop F3 delays signal $d_T$ by time T2 before sampling it with rclk. The effect is the same as sampling $d_T$ time T2 before rclk. The result of this early sampling is signal $d_E$.

Signals $d_L$ and $d_E$ are the result of sampling an asynchronous signal and thus may enter a metastable state. To allow time for any metastable states to settle out, these signals are passed through brute-force synchronizers S1 and S2 respectively. This produces delayed and synchronized versions of the late and early signals: $d_{LS}$ and $d_{ES}$. To achieve sufficiently low probability of synchronization failure, signals $d_{LS}$ and $d_{ES}$ will be delayed by S (typically 2 to 4) cycles of rclk from $d_L$ and $d_E$. Flip-flops F2 and F3 can be considered the first stage of synchronizers S1 and S2 respectively, or these flip-flops can be omitted and the synchronizers used directly to take the early and late samples.

Exclusive-OR gate X1 detects when there is a difference between $d_{LS}$ and $d_{ES}$. The output of this gate, det, when true signals that S cycles ago, signal $d_T$ had a transition that occurred in the window [−T2, T1] relative to the transition of rclk. In this way, the phase detector 500 may detect when the transmit clock phase is in the range [−T2/T, T1/T], where T is the transmit clock cycle.

Delay lines T1 and T2 may be realized by chains of even numbers of inverters. These delays must be made large enough to include the keep-out window of register F2, $t_{ko}=t_s+t_h$, plus a guard band, g, on either side of this keep-out region. Optionally, 4 to 8 fan-out of one (FO1) inverters may be used for each delay line.

While only a single phase detector here is shown, it should be noted that two phase detectors may be used, one on the rising edge of rclk and one on the falling edge of rclk. The two detection signals may be used to reset the phase estimate to zero (plus (S+1)f) when a detection occurs on the rising edge of rclk and to 0.5 (plus (S+1)f) on the falling edge of rclk. This may protect against a metastable state being sampled from the delayed path when the phase precesses very slowly.

As described below with respect to FIGS. 5B-D, the phase detector 500 may be modified to use multiple samples for providing a more accurate phase measurement, may keep upper and lower bounds on the phase estimate (e.g. computing phase with interval arithmetic) for allowing more precise determination of when one clock is in the "keep-out" region of another, and may be automatically calibrated to determine what fraction of the cycle is being detected.

Figure 5B:
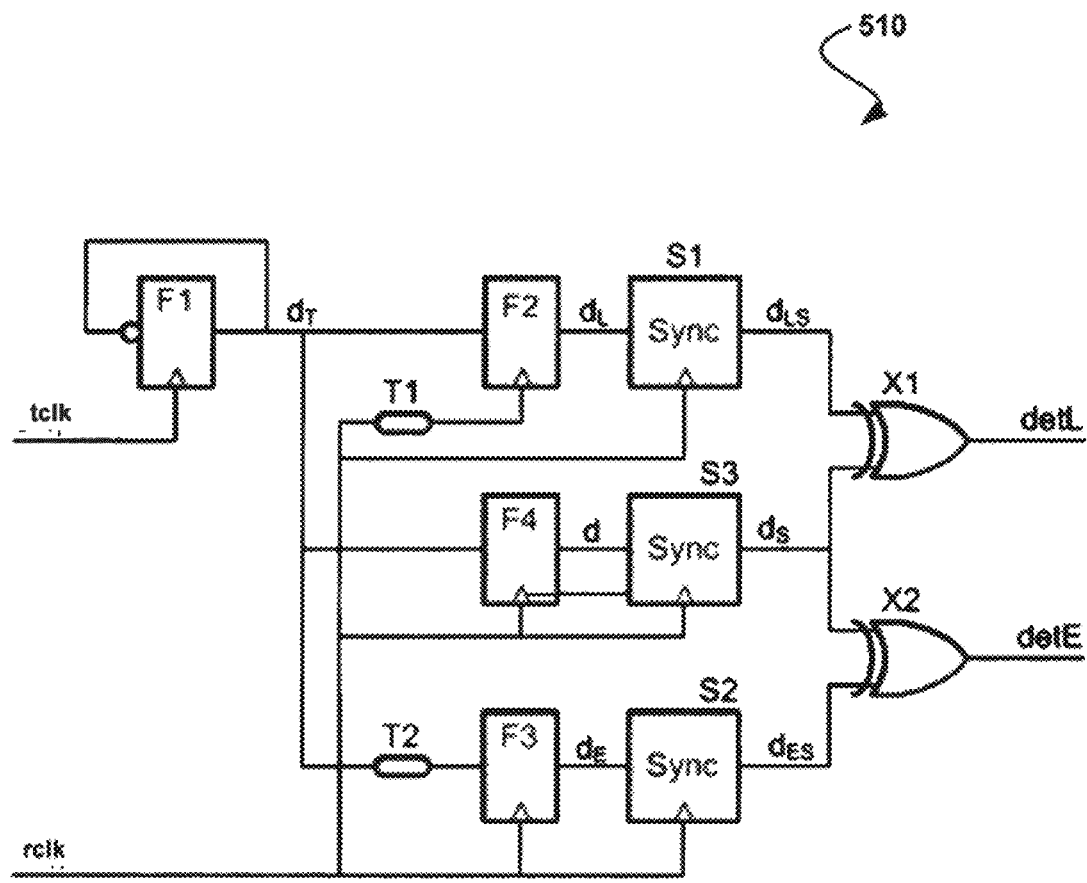
FIG. 5B illustrates a phase detector for separate early and late detection, in accordance with yet another embodiment.

FIG. 5B illustrates a phase detector 510 for separate early and late detection, in accordance with yet another embodiment. As an option, the phase detector 510 may be implemented context of the functionality and architecture of FIGS. 1-4. Of course, however, the phase detector 510 may be implemented in any desired environment. It should also be noted that the aforementioned definitions may apply during the present description.

As shown, two outputs are produced, including detE which detects when the transmit phase is in the range of [−T2/T,0] and detL which detects when the phase is in the range [0,T1/T]. By using detE and detL the phase estimate calculated based on a detected phase may be more accurately bound.

Figure 5C:
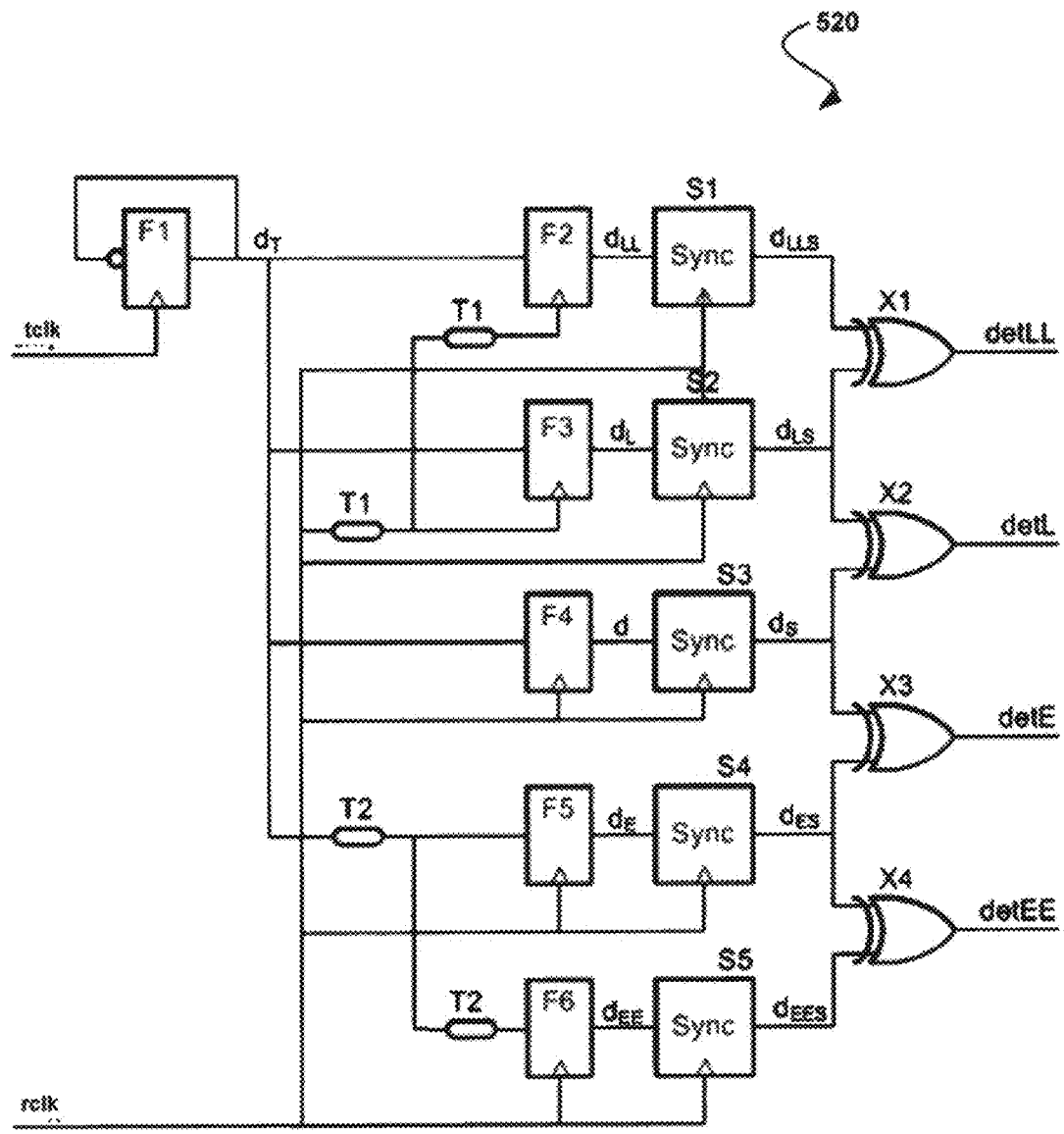
FIG. 5C illustrates a four-sample phase detector, in accordance with still yet another embodiment.

FIG. 5C illustrates a four-sample phase detector 520, in accordance with still yet another embodiment. As an option, the four-sample phase detector 520 may be implemented context of the functionality and architecture of FIGS. 1-4. Of course, however, the four-sample phase detector 520 may be implemented in any desired environment. It should also be noted that the aforementioned definitions may apply during the present description.

As shown, additional delay lines may be included (with respect to the phase detector 510 in FIG. 5B) to produce additional detection signals. It should be noted that the number of additional delay lines that may be included may optionally be extended to any desired number. By adding delay lines, greater accuracy of the phase information may be provided. The four-sample phase detector 520 generates detLL when the transmit phase is in [−2T2/T, −T2/T] and generates detEE when the phase is in [T1/T, 2T1/T].

When phase is detected, the original fast periodic synchronizer may effectively zero the phase estimate (e.g. set the phase to (S+1)f to account for the S cycles of delay synchronizing the phase detection). The time during which the transmit phase is in the keep-out region can be more accurately detected by maintaining upper and lower bounds on the phase estimate (e.g. by computing the phase estimate using interval arithmetic). The updates to the phase estimate may use bounds on frequency. Since the two synchronizers FIG. 4 each introduce only one cycle of uncertainty, the frequency is bounded by the range [f−1, f+1].

Table 2 illustrates one example of Verilog code which may be used for updating the upper and lower phase estimate (up and lp, respectively) using the phase detector 510 in FIG. 5B. Of course, it should be noted that the code set forth in Table 2 is for illustrative purposes only, and thus should not be construed as limiting in any manner.

TABLE 2

```
if(detE) begin
    up = (0 + (S+1) * (f + 1)) ;
    lp = (−T2/T + (S+1) * (f−1));
end
else if (detL) begin
    up = (T1/T + (S+1) * (f + 1));
    lp = (0 + (S+1) * (f−1)) ;
end
else begin
    up = up + f + 1 ;
    lp = lp + f − 1 ;
end
```

The code shown in Table 2 sets the upper and lower bounds to the appropriate values on a phase detection and then evolves them over time using the bounds on frequency. Using upper and lower bounds for phase estimates indicates that the transmit clock domain is in the keep-out region when these bounds overlap the guard banded region [−c,c]. For example, this may occur when either the upper or lower bound is in the keep-out region, or if the upper bound is positive and the lower bound is negative.

The last case shown in Table 3 covers the situation where the phase region includes the entire keep-out region. Table 3 illustrates one example of Verilog code which may be implemented for using upper and lower bounds for phase estimates, based on signed arithmetic. Of course, it should be noted that the code set forth in Table 3 is for illustrative purposes only, and thus should not be construed as limiting in any manner.

TABLE 3 ko = ((up > −c) && (up < c)) | ((lp > −c) && (lp < c)) | ((up > 0) && (lp < 0)) ; // signed Table 4 illustrates one example of Verilog code which may be implemented for using upper and lower bounds for phase estimates, based on unsigned arithmetic. Of course, it should be noted that the code set forth in Table 4 is for illustrative purposes only, and thus should not be construed as limiting in any manner.

TABLE 4

*ko*=(up>*c*neg)|(up<*c*)|(lp>*c*neg)|(lp<*c*)|(up<lp); // unsigned

With the unsigned representation shown in Table 4, phase increments from 0 to a maximum value (all 1s) and cneg is a large positive value (nearly all 1s) corresponding to −c. With an even/odd synchronizer (described below), separate keep-out-even (koe) and keep-out-odd (koo) signals may be generated in this manner by qualifying ko with whether the current Tx cycle is even or odd.

Further, in order to determine the actual magnitude of T1/T, T2/T, etc. process variation which determines T1 and T2 is utilized, in addition to T, the transmitter cycle time. This may assume the synchronizer is in the receiver clock domain. If the synchronizer is in the transmit clock domain (e.g. estimating receiver phase) then is the receiver cycle time.

If the transmit and receive clocks are not rationally related, T1/T (and T2/T) will be measured by detecting the fraction of transmit cycles that result in a detection. This may be accomplished while measuring the frequency by adding two additional counters. If the two clocks are not rationally related, the receive clock will uniformly sample the transmit clock and this fraction may converge to T1/T (or T2/T).

Figure 5D:
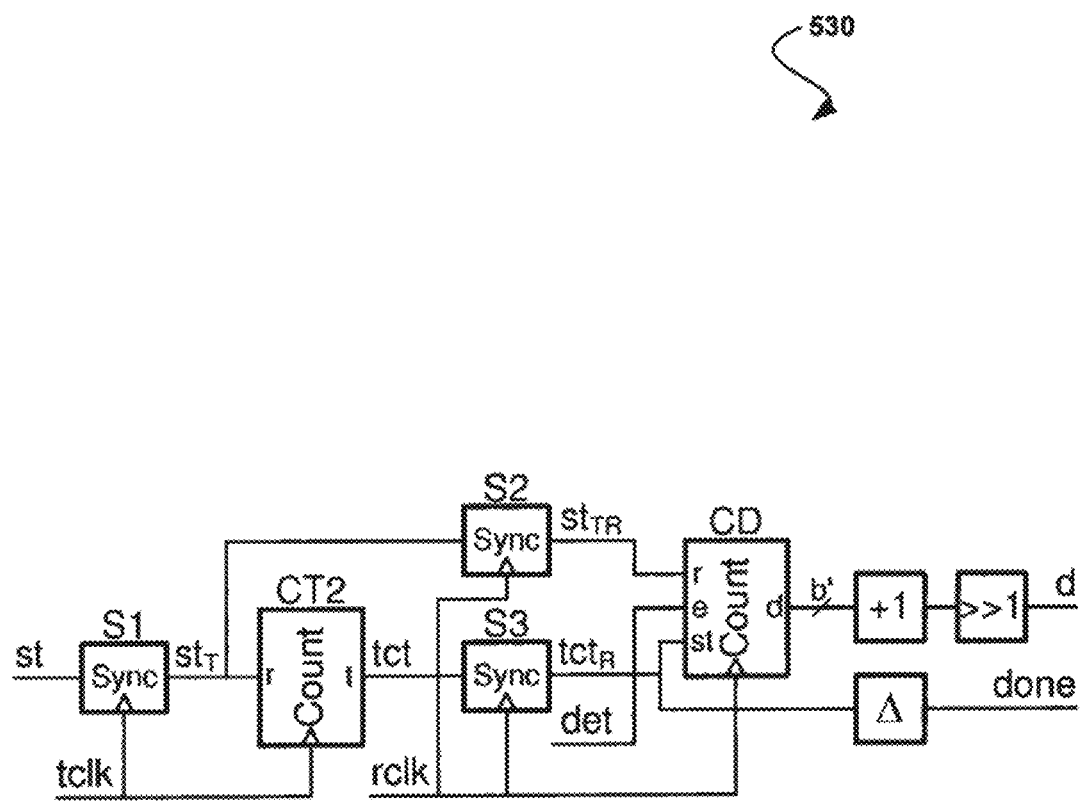
FIG. 5D illustrates a phase detector calibrator, in accordance with another embodiment.

FIG. 5D illustrates a phase detector calibrator 530, in accordance with another embodiment. As an option, the calibrator 530 may be implemented context of the functionality and architecture of FIGS. 1-5C. For example, the phase detector calibrator may be a component of the phase detector described above. Of course, however, the calibrator 530 may be implemented in any desired environment. It should also be noted that the aforementioned definitions may apply during the present description.

As shown, the calibrator 530 measures the detection interval, d. The calibrator 530 operates by counting the number of tclk cycles during which det (det=dete|deto) is true during the 2b tclk cycles it takes for counter CT2 to reach its terminal count. This gives 2d as a b-bit binary fraction. Like the frequency estimate, this measurement of d has an accuracy of +/−1 due to the uncertainty of the synchronizer delays. Given this uncertainty, the output of CD (a counter) is incremented to give an upper bound on 2d (e.g. such that the upper bound on the detection interval associated with the phase estimate is provided to compensate for synchronizer delays). An additional value may be added at this point (not shown) to provide guard band (e.g. a bound on d that accounts for voltage and temperature variation and for medium-frequency jitter) as described above. Right-shifting this number by one bit position gives d. The done signal indicates when the measurement of d is complete.

The calibrator 530 only uniformly samples tclk phase if the clocks are not rationally related. If they are rationally related then the receive clock repeatedly visits the same D (denominator of rational ratio) points on the unit phase circle. If D is large enough, this is sufficient. The estimation error is less than 1/D. For small D, the phase detector can be calibrated using an independent frequency source—for example a ring oscillator—to drive the CD counter. To this end, the calibrator 530 may allow the phase detector to be self-calibrating.

Figure 5E:
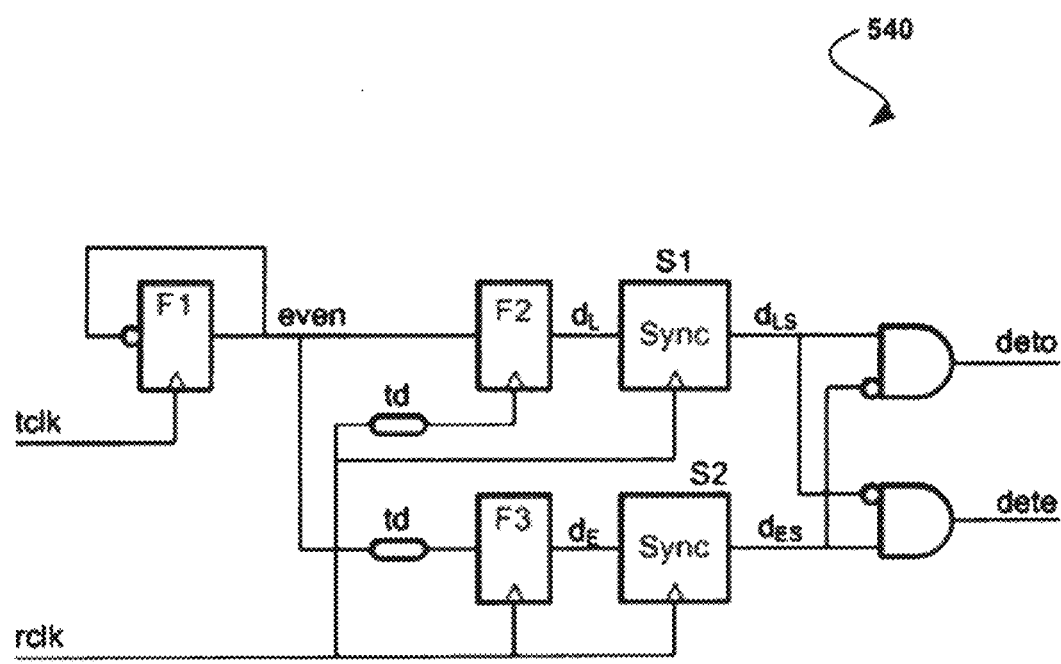
FIG. 5E illustrates a phase detector for detecting even and odd phases, in accordance with another embodiment.

FIG. 5E illustrates a phase detector 540 for detecting even and odd phases, in accordance with another embodiment. As an option, the phase detector 540 may be implemented context of the functionality and architecture of FIGS. 5A-5D. Of course, however, the phase detector 540 may be implemented in any desired environment. It should also be noted that the aforementioned definitions may apply during the present description.

The phase detector 540 detects when a transition on a transmit data signal falls in a window of $\pm t_d$ around the receive clock edge. The phase detector samples transmit signal "even" which toggles every cycle. This signal is high during even tclk cycles and low during odd tclk cycles. Flip-flop F2 samples "even" with rclk delayed by $t_d$ giving $d_L$, a sample of "even" $t_d$ after the rising edge of rclk, i.e., a late sample. An early sample, $d_E$ is produced by F3 which samples "even" delayed by $t_d$.

If an edge of "even" occurs between $t_d$ before rclk and $t_d$ after rclk, the values sampled by F3 and F2 will be different. The early and late samples are synchronized to the receive clock domain by a pair of brute-force synchronizers generating synchronized early and late samples $d_{ES}$ and $d_{LS}$ respectively. Differences between the synchronized early and late samples are detected by a pair of AND gates. If the early sample is high and the late sample low, an even edge of tclk (one that ends an even cycle) is detected and "dete" is asserted. If the early sample is low and the late sample is high, an odd edge of tclk is detected and "deto" is asserted.

There are two brute-force synchronizers in the phase detector that operate every cycle of rclk. These synchronizers, however, like those in the frequency measurement unit, are off the critical path, so their delay can be made large to make the frequency of synchronization failure arbitrarily small. A combined delay, S, of 4 or 5 cycles for the sampling flip-flop plus synchronizer is typically adequate to maintain a very failure frequency less than $10^{-40}$ Hz.

To initialize the phase estimator, as described below, the value of $t_d$ is bounded. While it is possible to compute a worst-case upper bound on $t_d$, a more accurate phase estimate may be generated if the instantaneous value of $t_d$ is measured and then a guard band is added to this measurement to account for variation of $t_d$ with temperature and voltage.

Figure 6:
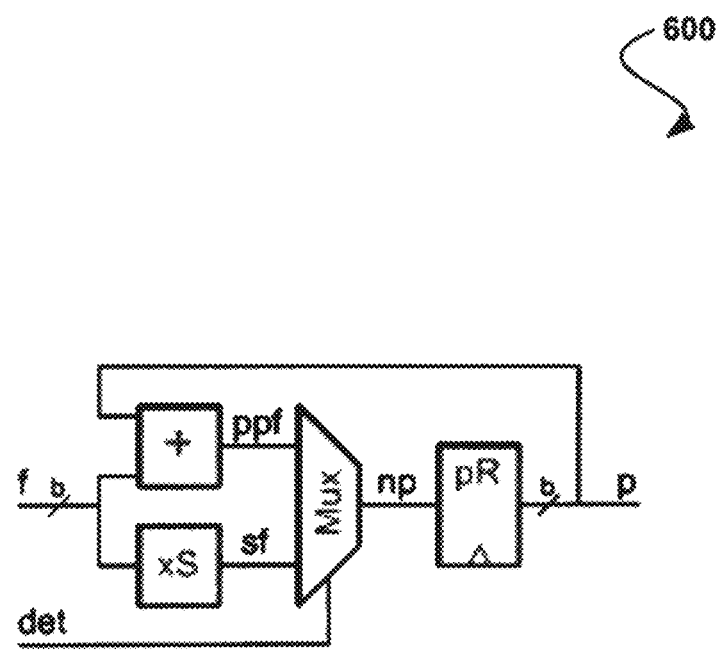
FIG. 6 illustrates a phase estimator, in accordance with yet another embodiment.

FIG. 6 illustrates a phase estimator 600, in accordance with yet another embodiment. As an option, the phase estimator 600 may be implemented context of the functionality and architecture of FIGS. 1-5E. Of course, however, the phase estimator 600 may be implemented in any desired environment. It should also be noted that the aforementioned definitions may apply during the present description.

As shown, the phase estimator 600 operates by keeping a b=bit running estimate of the phase of tclk relative to rclk. This estimate, p, is a b-bit fraction that represents values between zero and one around the unit circle. Phase estimate p is reset to (S+1)f each time the phase detection logic asserts det, indicating it has detected a transition of $d_T$ in the window [−T2, T1]. When det is not asserted, the phase is incremented by, f, the relative frequency of tclk each cycle of rclk. Register pR holds the b-bit running phase p. If det is asserted, phase p, is reset to (S+1)f to reflect that the phase was zero S cycles ago, before the delay of the synchronizers in the phase detection logic. When det is low, the phase estimate is updated by adding f to the running sum each cycle.

Note that the look-ahead factor A is set to S+1 so that the running phase p predicts the phase of tclk at the next rising edge of rclk. This enables the multiplexer in FIG. 3 to be set to select the delayed version of the input data before the rising edge of rclk samples a direct input that is transitioning in the keep-out region.

The accuracy of the phase estimate may be based on the window of the phase detector and the accuracy of the frequency estimate. Upon a detection, the accuracy may be initially equal to the window of the phase detector [−T2, T1]. In response to each cycle without a detection, the error in the frequency estimate may be a full LSB.

Figure 7:
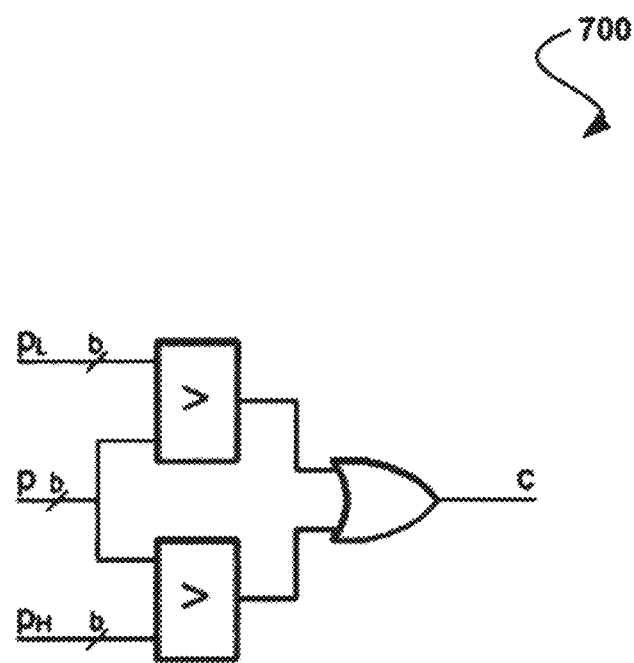
FIG. 7 illustrates a conflict detector, in accordance with still yet another embodiment.

FIG. 7 illustrates a conflict detector 700, in accordance with still yet another embodiment. As an option, the conflict detector 700 may be implemented context of the functionality and architecture of FIGS. 1-6. Of course, however, the conflict detector 700 may be implemented in any desired environment. It should also be noted that the aforementioned definitions may apply during the present description.

The conflict detector 700 includes one embodiment of the hit detection logic. The conflict detector 700 compares the running estimate of the phase p, to limits $p_L$ and $p_H$. When interpreting p as an unsigned number, if $p<p_L$ or $p>p_H$, the output, c, will be asserted. This corresponds to the phase being in the range $[p_H, p_L]$ (e.g. a window around 0) when phases are interpreted as signed numbers. Such window may be set to be larger than the accuracy window $[-N2^{-(b+1)}-T2, N2^{-(b+1)}+T1]$.

Figure 8:
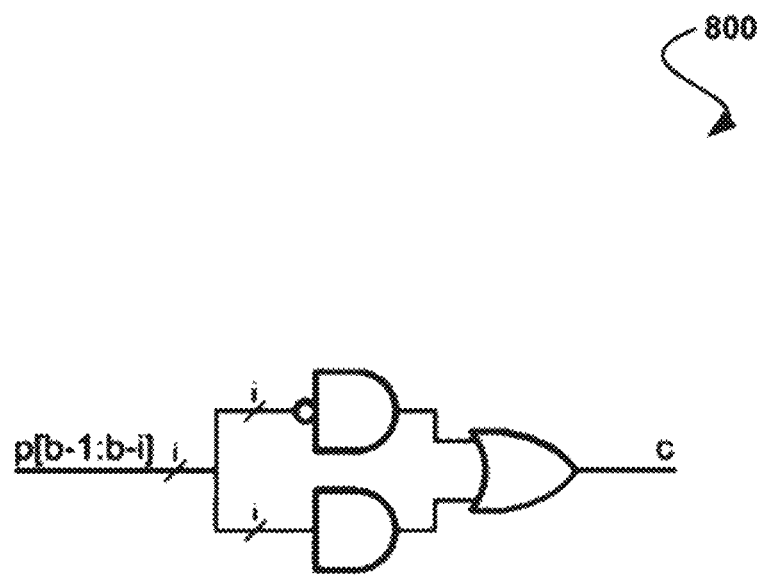
FIG. 8 illustrates a power-of-half conflict detector, in accordance with another embodiment.

FIG. 8 illustrates a power-of-half conflict detector 800, in accordance with another embodiment. As an option, the power-of-half conflict detector 800 may be implemented context of the functionality and architecture of FIGS. 1-7. Of course, however, the power-of-half conflict detector 800 may be implemented in any desired environment. It should also be noted that the aforementioned definitions may apply during the present description.

When the limits $p_L$ and $p_H$ are restricted to be of the form $2^{-i}$, a simpler version of the hit detection logic shown in FIG. 8 can be used. The power-of-half conflict detector 800 detects when the most significant i bits of p are either all 0 or all 1. For example, to detect when p is in the range [−⅛, ⅛], it may be determined when the upper 3 bits of p are all 0s or all 1s. As another example, p may be detected as being in the range [−¼,¼] by detecting when the upper 2 bits of p are all 0s or all 1s.

Table 5 illustrates parameters that may be utilized in the example of operation of the all-digital plesiochronous synchronizer 300 in FIG. 3 described in Table 6. It should be noted that such parameters and example of operation are set forth for illustrative purposes only, and thus should not be construed as limiting in any manner.

TABLE 5

| | |
|---|---|
| f | 0.467 |
| keep-out window | [−0.01, 0.01] |
| detection window | [−0.05, 0.05] |
| conflict window | [−0.125, 0.125] |
| S (look ahead cycles) | 4 |

In Table 6 shown below, the example of operation is shown. The first column reflects the cycle number and the second column shows the actual phase of tclk relative to rclk. The column labeled Det indicates when the actual phase falls within the detection window of the phase detector. The actual output of the phase detector is three cycles later, as reflected in the column labeled Del. When Del is true, the phase is set to 4f=0.868 which predicts the actual phase on the next cycle. The column labeled p shows the actual phase. On the initial detection it is completely accurate but may have an error as large as the detection window on subsequent detections. The column labeled c shows when the estimated phase falls within the conflict signal, and hence c is asserted. Note that this predicts the conflict one cycle before it actually occurs. Finally the column labeled ko shows when the actual clock phase falls within the keep-out window. In the single case where this occurs in the table, it is correctly predicted by c being asserted on the previous cycle.

TABLE 6

| Cycle | Phase | Det | Del | p | c | ko |
|---|---|---|---|---|---|---|
| 0 | 0.000 | T | | | | T |
| 1 | 0.467 | | | | | |
| 2 | 0.934 | | | | | |
| 3 | 0.401 | | T | 0.868 | | |
| 4 | 0.868 | | | 0.335 | | |
| 5 | 0.335 | | | 0.802 | | |
| 6 | 0.802 | | | 0.269 | | |
| 7 | 0.269 | | | 0.736 | | |
| 8 | 0.736 | | | 0.203 | | |
| 9 | 0.203 | | | 0.670 | | |
| 10 | 0.670 | | | 0.137 | | |
| 11 | 0.137 | | | 0.604 | | |
| 12 | 0.604 | | | 0.071 | T | |
| 13 | 0.071 | | | 0.538 | | |
| 14 | 0.538 | | | 0.005 | T | |
| 15 | 0.005 | T | | 0.472 | | T |
| 16 | 0.472 | | | 0.939 | T | |
| 17 | 0.939 | | | 0.406 | | |
| 18 | 0.406 | | T | 0.868 | | |
| 19 | 0.873 | | | 0.335 | | |
| 20 | 0.340 | | | 0.802 | | |
| 21 | 0.807 | | | 0.269 | | |
| 22 | 0.274 | | | 0.736 | | |
| 23 | 0.741 | | | 0.203 | | |
| 24 | 0.208 | | | 0.670 | | |
| 25 | 0.675 | | | 0.137 | | |
| 26 | 0.142 | | | 0.604 | | |
| 27 | 0.609 | | | 0.071 | T | |
| 28 | 0.076 | | | 0.538 | | |
| 29 | 0.543 | | | 0.005 | T | |
| 30 | 0.010 | T | | 0.472 | | |
| 31 | 0.477 | | | 0.939 | T | |

The following presents an analysis of the accuracy of the all-digital plesiochronous synchronizer 300 in FIG. 3. The relative sizes of the keep-out window, the detection window, and the conflict window determine the precision b required for the frequency and phase estimate. Let d be the size of the detection window, g be the guard band between the detection window and the keep-out window, and c be the size of the conflict window. In the example above, d is 0.10, g is 0.04, and c is 0.25.

When an accurate phase estimate is determined, the system clearly guarantees a safe synchronization. At the sample time, the transmit phase is known to be $\phi \in [lp, up]$, and if $lp \in [x, 1+x)$ the even register is safe to sample. If the system parameters, b, and d are chosen properly, the system also guarantees safe synchronization, in plesiochronous mode, when an accurate phase estimate is not known, because it has been long enough since a detection for lp and up to diverge by the threshold, k. In this plesiochronous case, it can be shown that the frequency will be in a range where a phase detection will occur sufficiently far in advance of a keep-out event for the synchronizer to guarantee proper sampling.

Consider the following cases for f:

For f<g/S (the guardband) there will be a detection before an error. In this case the phase will move slowly enough into the detection region that a detection will take place S cycles before the phase enters the keep-out window giving us time to synchronize the detection, update the phase estimate, and assert the conflict signal before an actual conflict occurs.

For g/S≤f<d there will be a detection every N=1/f cycles, at least once each time the phase rotates around the unit circle. So as long as $2^{-b}$<gck/S there will be a detection before too much error is accumulated in the phase estimate. (Here k=0.25 is a factor to add additional precision.) For example, for the numbers of our example we have gck/S=(0.04)(0.25)(0.25)/4=0.000625, and b=11 bits is sufficient precision.

For f≥d f is represented as a rational fraction with a bounded denominator plus an error term, f=N/D±e where D≤C=[1/d]. As shown below, the properties of sequences of fractions with bounded denominators, called Farey Sequences, guarantees that eDC<1. In this case there may be a repeating pattern of D points around the phase circle that shifts by De each D-cycle period. This gives the same two cases as for f<d.

If De<g/S the phase shift each period is small enough that there will be detection before error, the same as when f<g/S.

If g/S≤De≤d then a detection will occur every 1/(D2e) cycles so if $2^{-b}$>gck/S there will be a detection before we accumulate too much error. The requirement on b here is exactly the same as in the g/S≤f<d case above.

We need to show that for f>d>1/C we can always represent f as f=N/D±e with D≤C and eDC<1. Consider the Farey Sequence F(C), the sequence of rational numbers between 0 and 1 with denominators D≤C. For two adjacent numbers from this set, p/q, r/s, it will always be the case that r/s=(ps+1)/qs where q, s<=C and (ps+1)=qr. Then the distance between two adjacent rationals p/q and r/s is 1/qs. We allocate values of f between p/q and p/q+1/q(s+q) to p/q and numbers from r/s−1/s(s+q) to r/s. Then we know e=1/q(s+q), eDC=(1/q(s+q))qC=C/(s+q)<1, because s+q>C due to the properties of Farey Sequences.

Dependence between synchronizer parameters dictates that they be chosen in the order $p_D$, d, c, and then b. The value of the phase delay $p_D$ sets a number of constraints on the other parameters. Setting $p_D$=0.5 as in the example above gives maximum flexibility at the expense of a slight increase in average delay of the synchronizer. Delay can be reduced by setting $p_D$ to a smaller value, say 0.1. However, this may place very tight constraints on the remaining parameters. Whichever value is chosen for $p_D$, the phase detector may be implemented to detect when transitions of $d_T$ occur both with phase 0 and with phase $p_D$ and the phase estimator may be implemented to reset its phase estimate accordingly on both events. When De is very small the phase will be reset before a sample enters the keep-out region of either sampling path.

The size of the detection region, d, in part determines the error in the phase measurement and hence is set small enough so that the phase estimator can accurately discriminate between when to select the direct and delayed data values. A constraint is that d<$p_D$/2−k where k is the accuracy parameter chosen for the phase estimator. On the other hand, choosing a small d gives a small guardband and hence increase the number of bits utilized in the frequency and phase estimators. In one embodiment, setting d to about $p_D$/4 balances these two constraints. Since d is determined by an inverter delay line, its value will vary considerably across PVT, and thus the synchronizer is designed to work at both extremes.

The maximum tolerance for error is realized when the conflict detection window, c, is set to be half of $p_D$. For example, when $p_D$ is 0.5 (as in the example above), setting c to [−0.25,0.25] gives the maximum margin for error. The phase can be off by 0.25−$t_{ko}$ and the synchronizer will still avoid sampling an unsafe signal. On the other hand, setting c so large gives many "false positive" selections of the delayed data signal which increases average synchronizer delay. In one embodiment, c is set to either [−0.25,0.25] or [−0.125, 0.125]. Having c be a power of one half allows the simple detection circuit of FIG. 8 to be used. Once, $p_D$, d, and c are chosen, the minimum value for b is selected as described above so that $2^{-b}$<gck/S.

As an option, costly parts of the all-digital plesiochronous synchronizer 300 in FIG. 3 may be shared between instantiations of the synchronizer. A single copy of the frequency estimation block can be shared between all synchronizers that synchronize signals between tclk and rclk, where the value f is generated by one block and distributed to all synchronizers between these two clock domains. In a similar manner a single phase detection block, phase estimation block, and conflict detection block can be shared between a number of synchronizers that share the same phase relationship between tclk and rclk.

Figure 9:
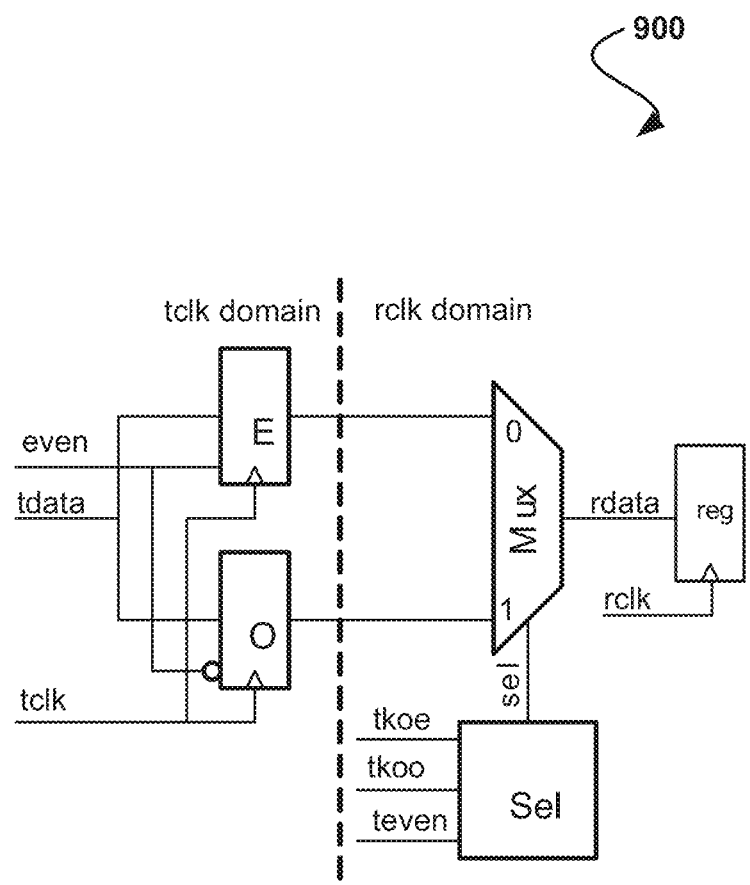
FIG. 9 illustrates a forward synchronizer, in accordance with yet another embodiment.

FIG. 9 illustrates a forward synchronizer 900, in accordance with yet another embodiment. As an option, the forward synchronizer 900 may be implemented context of the functionality and architecture of FIGS. 1-2 and 4-8. Of course, however, the forward synchronizer 900 may be implemented in any desired environment. It should also be noted that the aforementioned definitions may apply during the present description.

With respect to the present embodiment, limitations associated with sampling a delayed version of the signal may be avoided. To forward a multi-bit signal from the transmit to the receive clock domain without flow control, the transmit clock writes a pair of registers on alternate cycles. For example, register E is written on even cycles (updated at the end of the even cycle), and register O is written on odd cycles.

The receiver then uses its phase estimate to select the most recently written transmit register that is "safe" to sample in the receive clock domain (at the end of the current rclk cycle). The selection is based on the predicted tclk phase at the end of the current rclk cycle, p. On each receive clock, register O is selected if the transmit clock phase is between e.x and o.x, where e refers to the even cycle, and x is the "keep out" margin. The E register is selected otherwise. The delay of this synchronizer will vary between 0.x and 1.x depending on phase with an average of 0.5+0.x.

While the present embodiment is described with respect to even and odd clock cycles and two registers, it should be noted that in other embodiments any number of clock cycles and registers may be utilized. Thus, clock cycles can be labeled modulo N and N registers can be employed. Increasing the number of registers allows for very large keep-out regions (e.g. larger than a single UI). Using N registers for this reason can be applied to both the forward synchronizer shown in FIG. 9 and the flow-control synchronizer described below with respect to FIG. 11.

As shown in FIG. 9, and with respect to the transmitter side, "tdata" is written alternately into the E and O registers on each cycle of "tclk". On the receiver side, the select logic determines which of the two registers is selected to output on "rdata". The select logic may base this decision on the phase estimate of the transmitter clock generated by the frequency and phase estimation logic (not shown). This logic produces intermediate signals that indicate when the phase is in the even (or odd) keep out regions "tkoe" ("tkoo") and when the transmitter is in the even clock cycle "teven".

Table 7 shows one example of code capable of being used for selecting a signal. It should noted that such code is set forth for illustrative purposes only, and thus should not be construed as limiting in any manner.

TABLE 7

Wire sel = tkoe | (teven & ~tkoo) ;

Thus, with respect to the present embodiment, the odd register is selected when the transmitter is in its even clock cycle (odd register just written at the end of the odd clock cycle) unless the receive clock is in the odd keep-out region. The even register is selected otherwise.

Upon initialization, the forward synchronizer 900 can go through various different states. Table 8 shows the optional states of the forward synchronizer 900 during initialization. Of course, it should be noted that such states are set forth for illustrative purposes only and thus should not be construed as limiting in any manner.

TABLE 8

| R | Reset | Start frequency measurement process |
|---|---|---|
| FA | Frequency | Wait for frequency measurement to complete |
|  | Acquisition | Record if a phase detection occurs during this period. If no phase detection −> Plesiochronous |

TABLE 8-continued

| | | |
|---|---|---|
| PA | Phase Acquisition | Wait for phase detection Time out –> Plesiochronous |
| T | Tracking | Track estimated phase Age phase until next detection if phase becomes too old –> Plesiochronous If frequency changes by more than threshold –> Brute-force |
| M | Plesiochronous | Operate in Plesiochronous mode Look for a phase detection If phase detection –> Tracking If frequency changes by more than threshold –> Brute-force |
| B | Brute-force | Resort to using a brute-force synchronizer. Need to see several stable frequency measurements to return to FA. |

Figure 10:
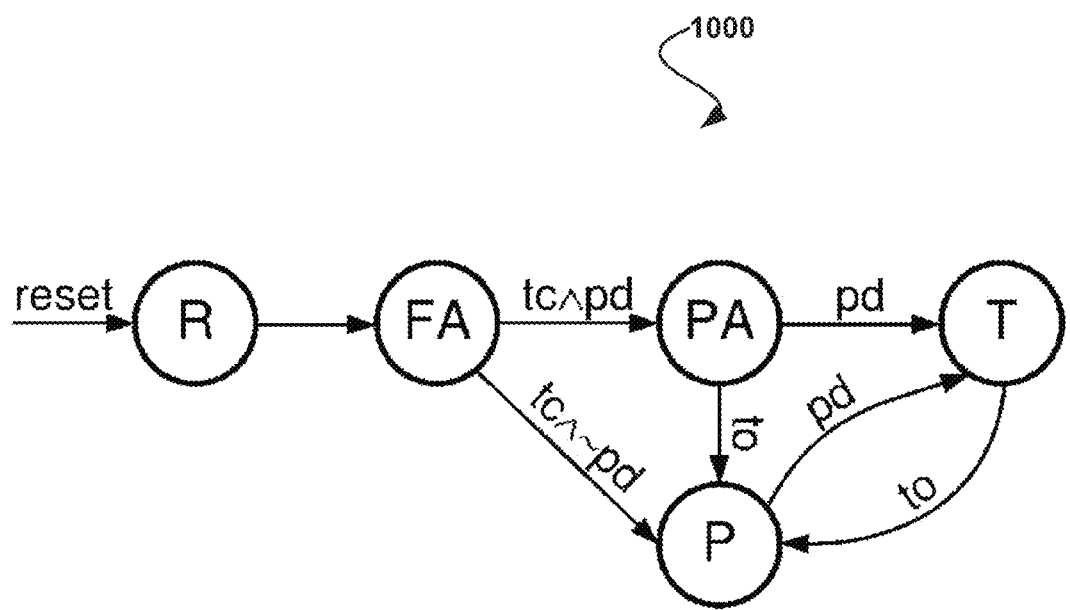
FIG. 10 illustrates a synchronizer state diagram, in accordance with the operation of the forward synchronizer shown in FIG. 9.

As described with respect to FIG. 10, on reset the forward synchronizer 900 enters the frequency acquisition (FA) state and starts its pair of counters to measure the frequency of the "other" clock. During this state the forward synchronizer 900 checks to see if there is a phase detection (phase falling into the detection region).

Once frequency is acquired, the phase acquisition (PA) state is entered and the forward synchronizer 900 waits for a phase detection. At this point a frequency estimate, f, and a phase estimate, p, have been determined and the tracking state (T) is entered. If there is no phase detection (e.g. a timeout occurs), the two clocks are rationally related (f=N/D) (or nearly rationally related) with a phase offset so that the D hits around the phase circle stay out of the detection region. In this case the M state is entered since the phase precession is guaranteed to be slow enough that it will be detected before an error occurs.

In the tracking state (T) the forward synchronizer 900 updates the phase estimate each cycle and take appropriate actions when the forward synchronizer 900 detects that it is in the even or odd keep out regions. The number of cycles since the last phase detection is counted and when this number exceeds a threshold, the phase estimate is no longer reliable and the forward synchronizer 900 enters the Plesiochronous (M) state.

If the phase is drifting very slowly (mesochronous or plesiochronous modulo a rational fraction) the forward synchronizer 900 can safely synchronize without prediction. In this case (the M state) the forward synchronizer 900 simply detects entry to the detection region with a brute-force synchronizer and uses large enough guard bands such that an error cannot occur during the several cycles required to synchronize the detection. For example, the even signal from the tclk domain is directly used to select between the E and O registers. This is safe because the phase is changing slowly enough, and the guard band, g=d−x, is large enough, so that a phase detection will occur, returning to the T state, before this signal becomes unsafe. Note that in the rational case as the phase drifts into the detection region a 1-of-D detection pattern may be identified (where D is the rational denominator). Going to the T state on the first detection may be utilized in such a situation.

Operation in the T state depends on the frequency being constant or nearly constant. To be safe (e.g. for situations where frequency may change during short periods of time, such as when changing between power states), the frequency measurement circuit may operate continuously and compare its measurement with the current estimate. If the difference is larger than a threshold, the forward synchronizer 900 may drop back to brute-force (B) mode. For example, the FIFO synchronizer described above can be adapted to work with respect to the frequency changing mode by Gray-coding the pointers and operating a pair of brute-force synchronizers in parallel with the E/O synchronizers. When frequencies are changing, the synchronizers switch to using the brute-force synchronizers (B mode). Once the frequencies stabilize, they change back to using the fast periodic synchronizers (M mode).

The forward synchronizer 900 may optionally only be used where either the clocks are periodic, or where deviations from periodic behavior are signaled explicitly (e.g. a "not periodic" signal triggers brute-force mode before the clocks start to vary unpredictably). In this way, detection of a frequency change that is too slow, whereby several unsafe samplings between the clock domain are capable of being made before the detection of a change, may be avoided.

As noted above, signals between two clock domains that have frequencies that differ by a rational number, i.e., $f_r=Nf_t/D$ for integer N and D can also be synchronized. With rational frequencies, N, D, and an indication that the two frequencies are rationally related are provided by the system. The phase between the two clocks is assumed to be unknown and can even be slowly varying.

When the clock domains are rationally related, no frequency measurement need be made. Instead f=N/D may be used as the frequency. Additionally, the phase may be kept multiplied by D to facilitate integration. For example, in one embodiment the phase is represented with an integer part, a, and a fractional part, b, so that the phase p=a·b/D.

Further, the phase may be detected as described above with respect to FIGS. 5B-E. Upper and lower bounds, up and lp are initialized to the bounds of the detection region scaled by D. The forward synchronizer 900 starts in an "initial" state. The first detection causes a transition to the "locked" state and initializes the phase bounds (up and lp). In the locked state the system repeatedly visits D relative phases, at least one of which is expected to cause a detection (and hence detect a possible conflict). After D+1 cycles without detection, a transition is made to the "safe" state.

It can thus be noted that D relative phases between the two clocks do not cause conflicts, and hence it is safe to directly sample both even and odd registers in all D phases. In the "locked" state, the scaled phase bounds (up and lp) are advanced by adding each cycle—modulo D. There is no uncertainty in the frequency, so the bounds will not diverge over time.

To this end, a phase detection (or lack thereof) is capable of being used to dynamically detect the phase difference when the clock domains are rationally related. Moreover, use of a table of size D to store the conflict pattern can be avoided by detecting conflicts from the estimated phase, such that area for large D can be also be avoided In one embodiment, if the phase between the two clocks changes slowly (by $\Delta p$ per cycle i.e., at least temporarily the actual frequency is $f_t=Nf_t/D+\Delta p$), then the system described above is implemented as long as $\Delta p<\min((d-k)/2D, (d-k)/2S)$, where (d−k)/2 is the one sided margin between the detect region (d) and the keepout region (k), D is the denominator of the rational frequency, and S is the delay of the phase detector synchronizer. This constraint ensures that the first step into the detection region (of at most $D\Delta p$) may not penetrate into the keep-out region and also that once detected, the detection may be synchronized before the phase enters the keep-out region.

To this end, the phase estimate can be used to construct a fast, simple forward synchronizer that moves a parallel signal from one periodic clock domain to another. Specifically, in the present embodiment, a forward synchronizer is provided that moves a parallel signal forward from the transmit clock (tclk) domain to the receive clock (rclk) domain, in a manner that is safe from synchronization failure, but without flow control. Further, this synchronizer can be employed in a FIFO synchronizer to provide synchronization and flow control, as described below.

Figure 11:
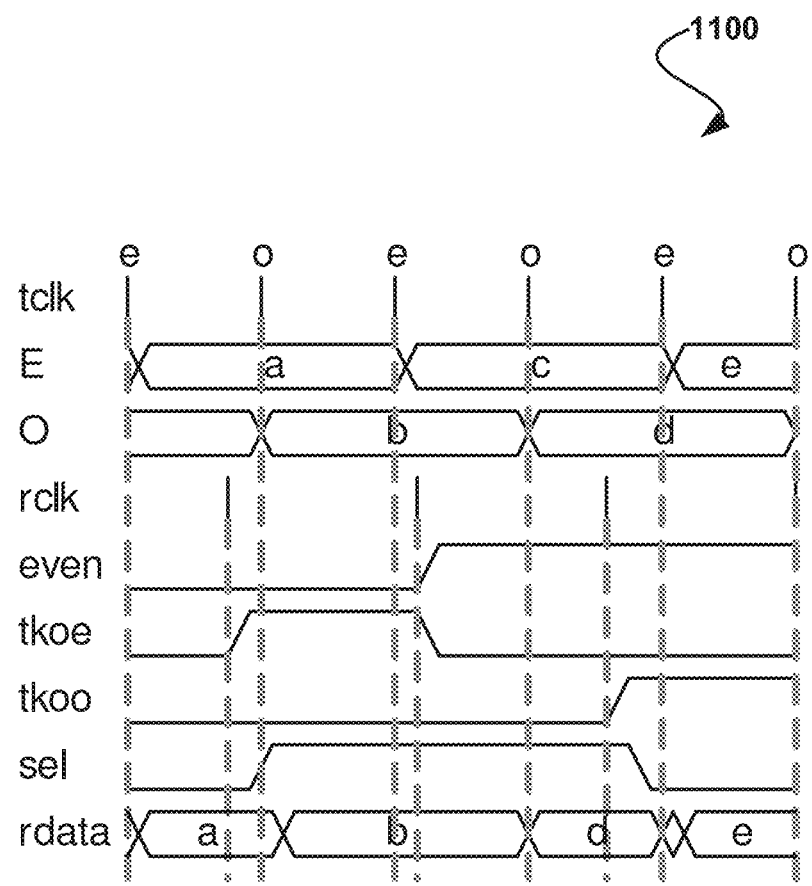
FIG. 11 illustrates a timing diagram of the operation of the forward synchronizer shown in FIG. 9.

FIG. 11 illustrates a timing diagram of the operation of the forward synchronizer shown in FIG. 9. With respect to the present embodiment, "tclk" is faster than "rclk". As shown, that the phase estimator signals (even, tkoe, and tkoo) reflect what the phase of the tclk will be on the next rising edge of rclk. Hence tkoe goes high on the first edge of rclk shown because the next edge of rclk is in the keep-out region of an even edge of tclk.

As shown, the most recently written register that is not in a keep-out region is always sampled. The first edge of rclk samples the value "a" from register E because this edge falls in an odd cycle of tclk. The next edge samples "b" from register O because this rclk edge is in the even keep out region of tclk. The third edge samples "d" from register O because it falls in an even tclk cycle. Finally, the last rclk edge samples "e" from register E because it falls in the odd keep-out region of tclk. Note that value "c" is never sampled because tclk is faster than rclk. To make sure that every value is sampled exactly once requires a synchronizer with flow control as described below with respect to FIG. 12.

Figure 12:
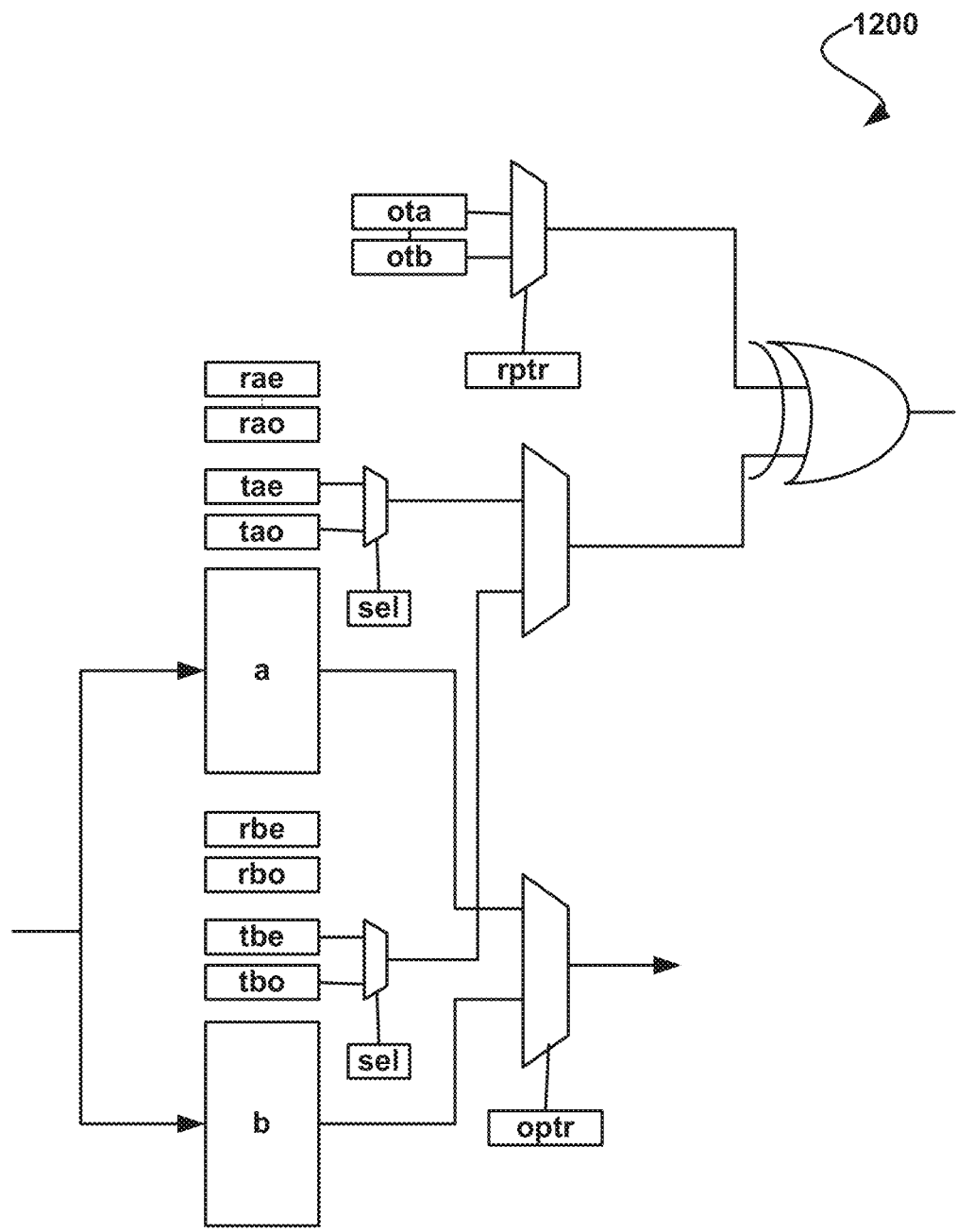
FIG. 12 illustrates a synchronizer with flow control, in accordance with yet another embodiment.

FIG. 12 illustrates a synchronizer 1200 with flow control, in accordance with yet another embodiment. As an option, the synchronizer 1200 may be implemented in the context of the functionality and architecture of FIGS. 1-11. Of course, however, the synchronizer 1200 may be implemented in any desired environment. It should also be noted that the aforementioned definitions may apply during the present description.

With respect to the present embodiment, flow control between the two clock domains may be provided. For example, frequency and phase estimators are provided in both the transmitter and receiver. The phase estimators can be extended to report phase in the range of 0-2 (in cycles), such that they describe whether the other clock domain is on an even or odd cycle and where in that cycle the clock is. The transmitter passes data through a pair of registers (data registers) and the receiver passes flow-control information through a pair of registers (reverse toggle registers). Using the phase estimate, the synchronizer computes when the other clock is in the "keep-out" region for an even or odd cycle. A protocol avoids sampling a register when in the keep out region for the cycle (even or odd) during which it was written.

With respect to the present embodiment, flow control is implemented in the synchronizer. The synchronizer 1200 with flow control operates by having the transmitter alternately write a pair of registers as described above with respect to FIG. 9, but the transmitter pauses to avoid overwriting registers before they are accepted by the receiver and to avoid writing registers when no valid data is available. The transmitter toggles a bit in each register (forward toggle registers) to signal when new data has been written to the register. The receiver alternately toggles a pair of flow-control flip-flops (reverse toggle registers) to signal when the transmitter data is accepted. The receiver may delay toggling a flip-flop because of backpressure from downstream flow-control (i.e., a not-ready signal). The transmitter knows that the receiver has accepted a value when the receiver has toggled the corresponding flow control flip flop.

In one embodiment, a ready/valid flow control protocol is utilized. The transmitter may optionally only update a transmit register when valid data is available. The transmitter signals not ready upstream when both registers are full. The receiver further signals valid out when it has received new word from the transmitter that has not yet been accepted by the downstream logic, as signaled by its ready input. When the ready input is low, the receiver may not accept a valid data word from the transmitter.

To make the clock domain crossing safe, the transmitter passes the toggle bit of the ta register through a pair of registers (forward toggle registers) updated on the even and odd clock cycles (tae and tao respectively). Similarly the toggle bit of tb is passed through the and tbo and the receive toggle registers are passed through rae, rao, rbe, and rbo.

The receiver looks at these synchronized toggle bits to determine when it is safe to sample ta or tb. At any point in time, the rtptr bit indicates whether the receiver is expecting its next data word on ta or tb. In an embodiment where the next word is arriving on ta, the receiver looks at the toggle bit of ta to see if a new word has arrived. If it is not in a keep out region, it looks directly at tat (the toggle hit of ta). If it is in the even (odd) keep out region, it looks at the version of tat synchronized on the odd (even) clock cycle, tao (tae).

If a toggle is seen, rtptr is toggled. A second pointer, optr drives the output multiplexer to decide which of ta or tb is applied to the receiver output. This pointer is advanced when there is valid data in the current register and the "ready" input is true, indicating that the downstream logic can accept the data. When optr is advanced, the corresponding receiver toggle bit, ra or rb, is toggled to signal that the data has been accepted. To disambiguate full from empty, when rtptr=optr, a rcount register keeps count of the words that have arrived but have not yet been passed on. This counter is incremented when rtptr is advanced and decremented when optr is advanced. When both are advanced, it remains unchanged. When rcount is zero, the receiver "valid" output is set low.

Figure 13:
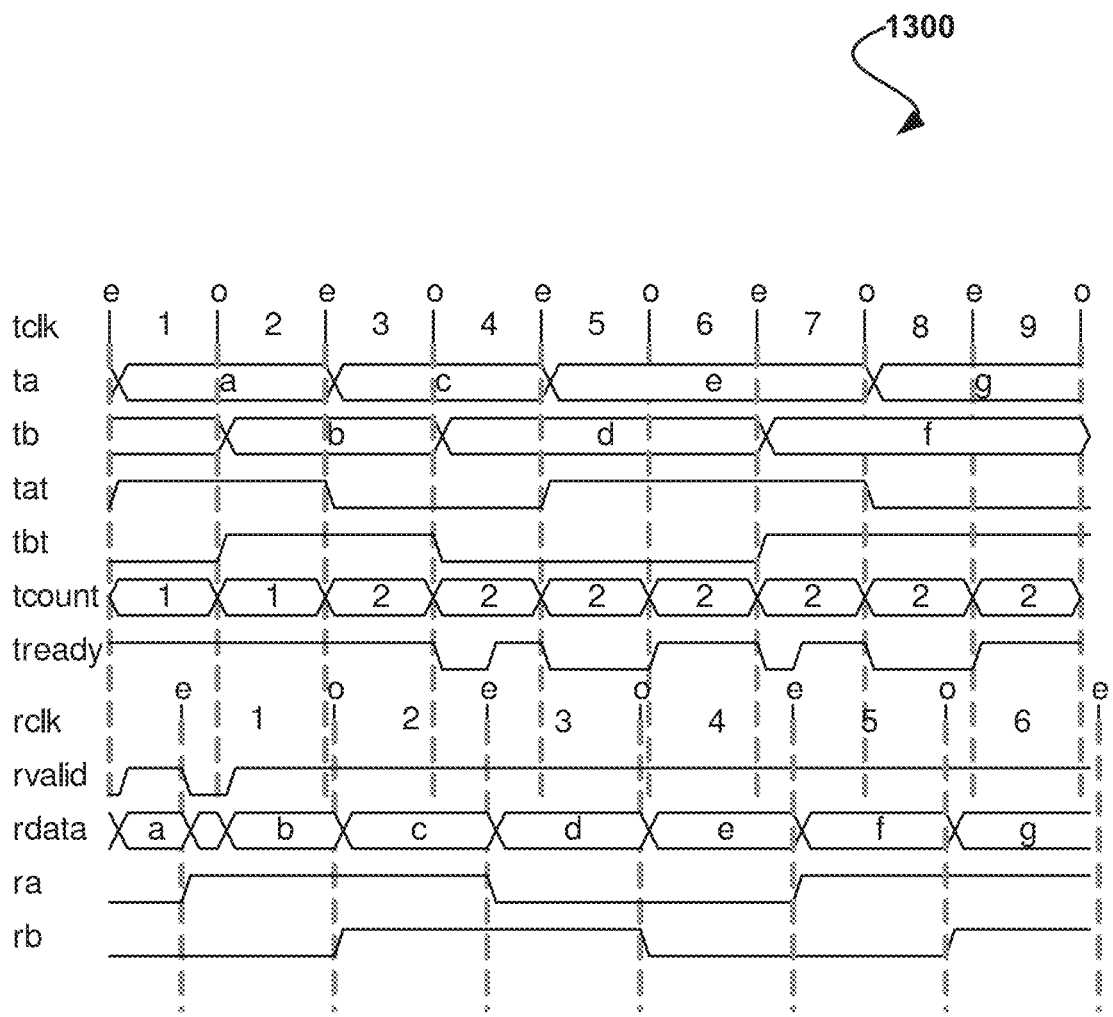
FIG. 13 illustrates a timing diagram of the operation of the synchronizer with flow control shown in FIG. 12.

FIG. 13 illustrates a timing diagram of the operation of the synchronizer with flow control shown in FIG. 12. With respect to the present embodiment, the transmitter is running faster than the receiver. The transmitter writes "ta" with "a" on its first even cycle and "tb" with "b" on its first odd cycle. These writes are reflected by toggling "tat" and "tbt" respectively. Because "optr" is initially zero, the "a" propagates directly to the output and is sampled by the first even edge of rclk. After accepting "a" rptr advances to select "b" (as soon as its ready) and "ra" toggles to signal acceptance.

The circuit proceeds in this manner with each edge of tclk enqueueing a new value and each edge of rclk dequeueing it. Note that the enqueues that fill the transmit registers make "tready" go low until the receiver edge that dequeues a value appears. The keep-out regions need to be large enough for the tready and rvalid signals to stabilize before their respective clock edges. On cycle 5, "tready" stays low the whole cycle, because the toggling of "rb" to accept "d" comes in the keep-out region leading the transmitter to apply backpressure, and the valid period of "d" and "e" is extended to three cycles. The same thing happens with the acceptance of "f" on cycle 8.

Transitions of transmit signals in the keep-out region of the receive clock (e.g., tat rising at the end of transmitter cycle 2) and of receive signals in the keep-out region of the transmit clock (e.g., rb rising at the end of receiver cycle 1) are handled using a variant of the simple forward synchronizer described above. This causes these transitions to be ignored on the dangerous edge but then seen safely on the next edge of the sampling clock. Thus, "tcount" remains at "2" in cycles 6 and 9, even though a value has been accepted and no new value has arrived. The acceptance occurred in the keep-out region and thus may not be seen until the next cycle.

Figure 14:
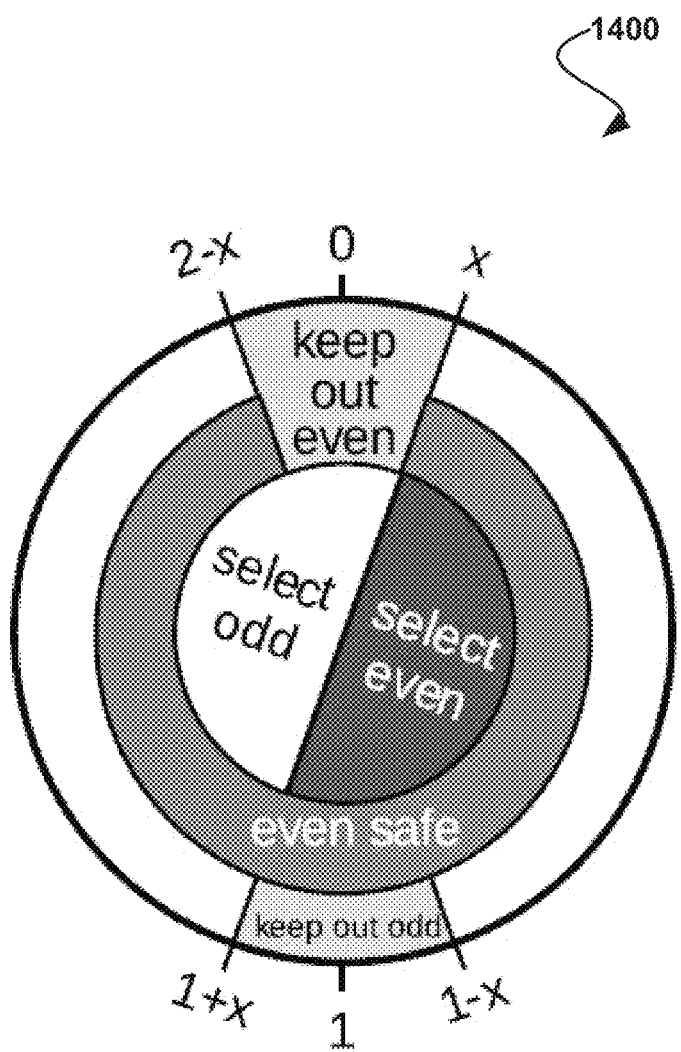
FIG. 14 illustrates a phase circle showing even and odd keep-out regions and a region in which the even register is selected, in accordance with another embodiment.

FIG. 14 illustrates a phase circle 1400 showing even and odd keep-out regions and a region in which the even register is selected, in accordance with another embodiment. As an option, the even/odd forward synchronizer phase circle 1400 may be implemented in the context of the functionality and architecture of FIGS. 1-13. For example, the phase circle 1400 may be implemented in the context of the forward synchronizer 9 of FIG. 9. Of course, however, the phase circle 1400 may be implemented in any desired environment. Again, it should be noted that the aforementioned definitions may apply during the present description.

In the present embodiment, the transmitter phase is a real number in the range [0, 2) which can be visualized on a phase circle as shown in FIG. 14. Odd clock cycles have a phase $\phi \in [0,1)$, and even clock cycles have $\phi \in [1,2)$. An odd (even) clock cycle ends in an odd (even) clock edge, and the signal even is high during even clock cycles (i.e., when $\phi \in [1,2)$). To avoid synchronization failure, the receiver does not sample the even (E) register during the even keep-out period $\phi \in [2-x, x)$ and the O register is avoided during the odd keep-out period $\phi \in [1-x, 1+x]$. These keep out periods are shaded light grey with reference to the present figure. The keep out window, with width 2x, represents the setup and hold window of the sampling flip-flop. The width of these keep-out regions are exaggerated in the figure. A typical 40 nm flip-flop may have a keep-out window of about 60 ps or just 6% of a 1 GHz clock period.

To meet our rule of selecting the most recently written register that is safe to sample, the selection logic selects the even (E) register when $\phi \in [x, 1+x]$ as shown by the dark grey shaded arc in the figure. The E register is selected as soon as the phase clears the even keep out region at $\phi = x$. The E register is safe to sample during the large medium grey arc shown with reference to the present figure, $\phi \in [x, 2-x]$ (everywhere but the even keep out region). However it is only the most recently written safe register up until $\phi = 1+x$. When $\phi \in [1+x, x)$ the odd register (O) is the most recently written safe register.

To make sure that every value is sampled exactly once requires a synchronizer with flow control, such as the FIFO synchronizer described below with respect to FIGS. 15-16. So far it has been assumed that the receiver knows the tclk phase, $\phi$. In practice, the receiver uses an estimate of tclk phase, p. To account for the estimation error, $\epsilon = |\phi - p|$, either a guard band is added to the detection of the keep-out region, or the phase estimate is computed using interval arithmetic as described below with respect to FIG. 7 and Table 9, giving a bound on $\epsilon$. When using interval arithmetic, the selection decision is made using the lower-bound of the phase (lp), since this a ways selects the most recently written register that is safe to sample.

Figure 15:
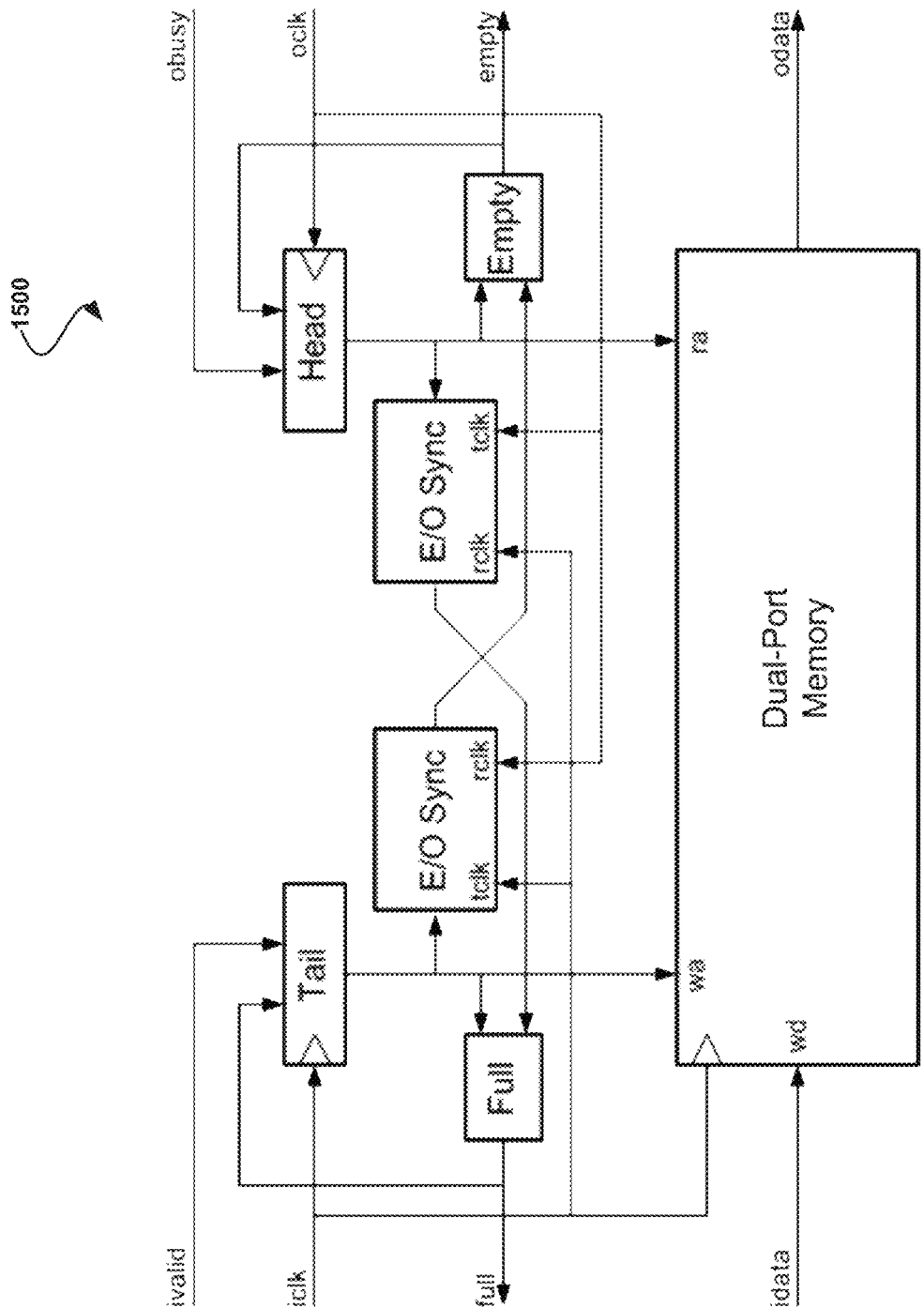
FIG. 15 illustrates a FIFO synchronizer using an even/odd forward synchronizer, in accordance with another embodiment.

FIG. 15 illustrates a FIFO synchronizer 1500 using an even/odd forward synchronizer, in accordance with another embodiment. As an option, the FIFO synchronizer 1500 may be implemented in the context of the functionality and architecture of FIGS. 1-14. Of course, however, the FIFO synchronizer 1500 may be implemented in any desired environment. Again, it should be noted that the aforementioned definitions may apply during the present description.

Figure 16:
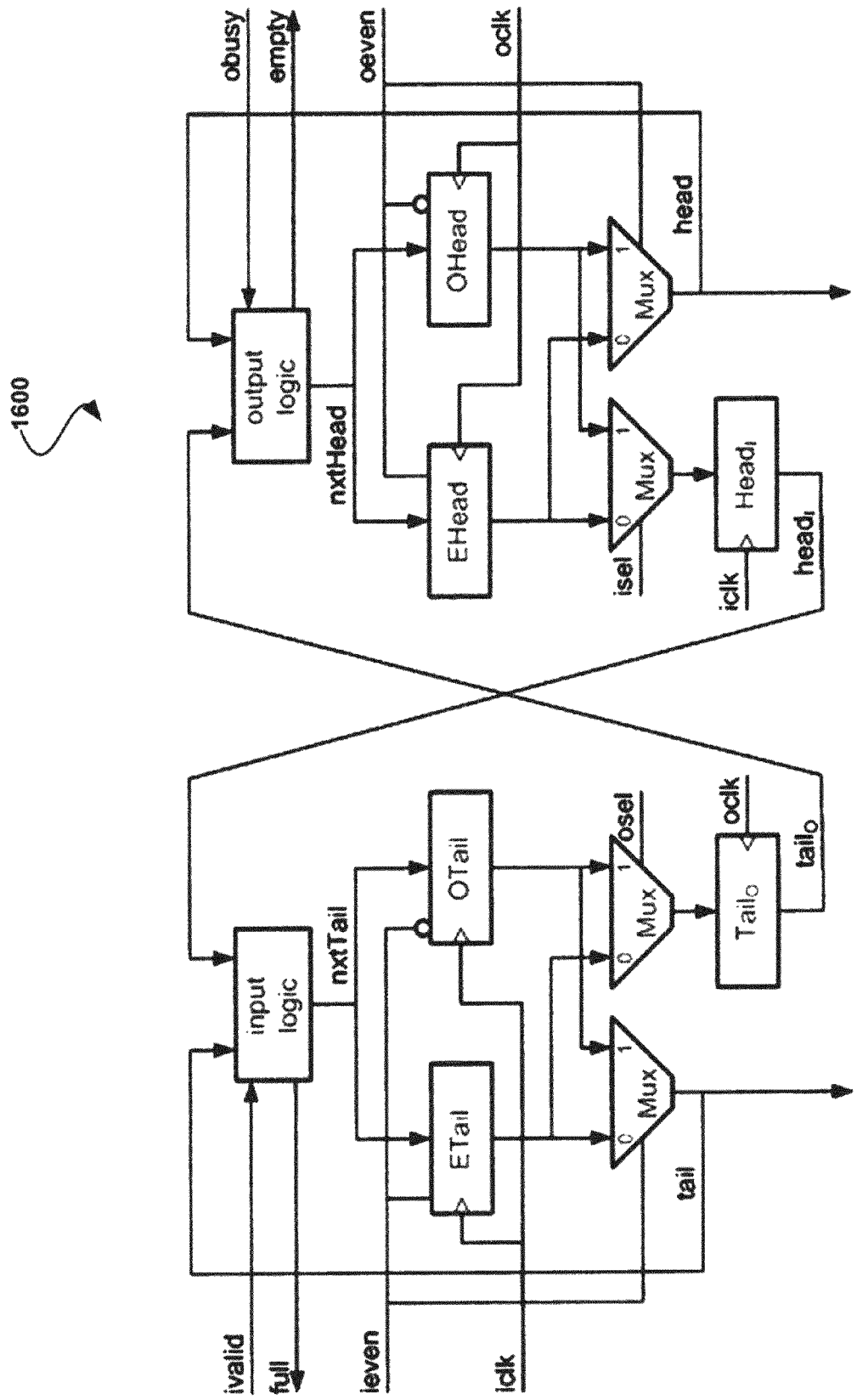
FIG. 16 illustrates a FIFO synchronizer where keeping even and odd versions of head and tail pointers further reduces FIFO latency, in accordance with another embodiment.

It should be noted that FIGS. 15 and 16 describe an embodiment for measuring the relative frequency of the two clocks and using this estimate to generate a phase estimate with error bounds. As shown with respect to FIG. 15, the FIFO synchronizer 1500 is realized using two E/O synchronizers. The FIFO uses a dual-port memory that is written synchronously and read asynchronously to hold data in transit. For small FIFOs, this memory is implemented as a flip-flop or latch array. Larger FIFOs use a RAM or register file macro.

The FIFO memory is written and the tail pointer incremented on the rising edge of the input clock (iclk) when input valid (ivalid) is true and full is false. The head pointer selects the value at the head of the FIFO to appear at the output port of the memory. The head pointer increments on the rising edge of the output clock (oclk) when empty is false and output busy (obusy) is false. The tail pointer and full logic are in the iclk domain and the head pointer and empty logic are in the oclk domain.

A pair of E/O synchronizers moves the head and tail pointers between the two clock domains. One synchronizer passes the tail pointer from the iclk domain to the oclk domain, and a second synchronizer passes the head pointer from the oclk domain to the iclk domain. For the tail synchronizer tclk=iclk and rclk=oclk while for the head synchronizer tclk=oclk and rclk=iclk. Each of these synchronizers includes the logic shown in 9 as well as the frequency and phase estimation logic described above.

FIG. 16 illustrates a FIFO synchronizer 1600 where keeping even and odd versions of head and tail pointers further reduces FIFO latency, in accordance with another embodiment. As an option, the FIFO synchronizer 1600 may be implemented in the context of the functionality and architecture of FIGS. 1-15. Of course, however, the FIFO synchronizer 1600 may be implemented in any desired environment. Again, it should be noted that the aforementioned definitions may apply during the present description.

A clock cycle of delay can be avoided by keeping even and odd versions of the head and tail pointers as shown in FIG. 16. During each cycle the input logic computes the next tail pointer and stores it into either the ETail register (on even cycles) or the OTail register (on odd cycles). A multiplexer controlled by ieven (input even) always selects the most recently written tail register onto the tail signal to be used as the write address. A second multiplexer controlled by osel, the select signal from an E/O synchronizer, selects the most recently written tail register that is safe to sample at the end of the next output clock onto signal tail$_O$ (tail in the oclk domain).

The tail$_O$ signal is used by the output logic to compute full and to compute the next head pointer. In operation, osel lags ieven, such that ieven always selects the most recently written tail register while osel may select the older register when the most recently written register is unsafe to sample. In a similar manner, the output section keeps even and odd head registers and uses a pair of multiplexers to generate the current head pointer (head) and a version in the input clock domain (head$_I$).

Compared to the conventional approach of using brute-force synchronizers to pass the head and tail pointers between clock domains, using even/odd synchronizers provides greater speed and simplicity. The latency of the FIFO synchronizer is reduced because the even/odd synchronizer has a delay of 0.5 cycles on average, compared to a brute-force synchronizer with a delay of S+0.5 cycles (typically 3.5 cycles), where S is the delay of a brute-force synchronizer. The design is also simpler because the head and tail pointers can be kept in binary form. With conventional brute-force synchronizers, the pointers must be Gray-coded to prevent more than a single hit from changing at one time.

FIGS. 17A-D illustrates various phase circles, in accordance with other embodiments. As an option, the phase circles may be utilized in the context of the functionality and architecture of FIGS. 1-16. Of course, however, phase circles may be utilized in any desired environment. Yet again, it should be noted that the aforementioned definitions may apply during the present description.

To show that the synchronizer operates properly, it is shown that either (a) detections will occur often enough that plesiochronous mode is never entered (i.e. that there will always be an accurate phase estimate), or (b) when in plesiochronous mode, a detection (p∈[−d,d]) occurs at least S+1 cycles before a keep-out event (p∈[−x,x]).

Figure 17A:
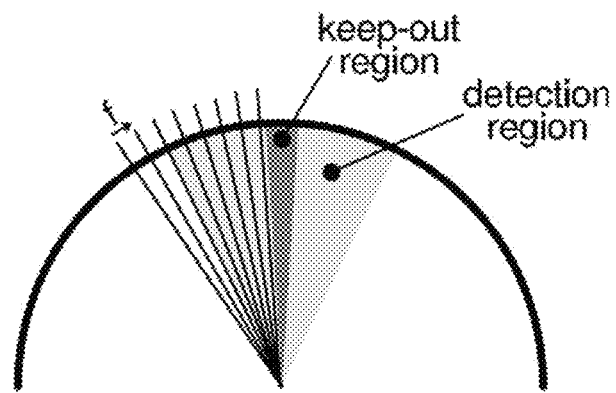
FIGS. 17A-D illustrates various phase circles, in accordance with other embodiments.

As shown in FIG. 17A, safe plesiochronous synchronization is achieved. For $f<f_g$ there is a detection before an error. In this case the phase moves slowly enough into the detection region that detection will take place at least A cycles before the phase enters the keep-out window, giving time to synchronize the detection, update the phase estimate, and avoid sampling the unsafe register. As also shown, the phase φ (radial lines) over eight clock cycles for a small value of f. Because $f<f_g$, the phase is in the detection region for more than A cycles (six in the figure) before entering the keep-out region.

Figure 17B:
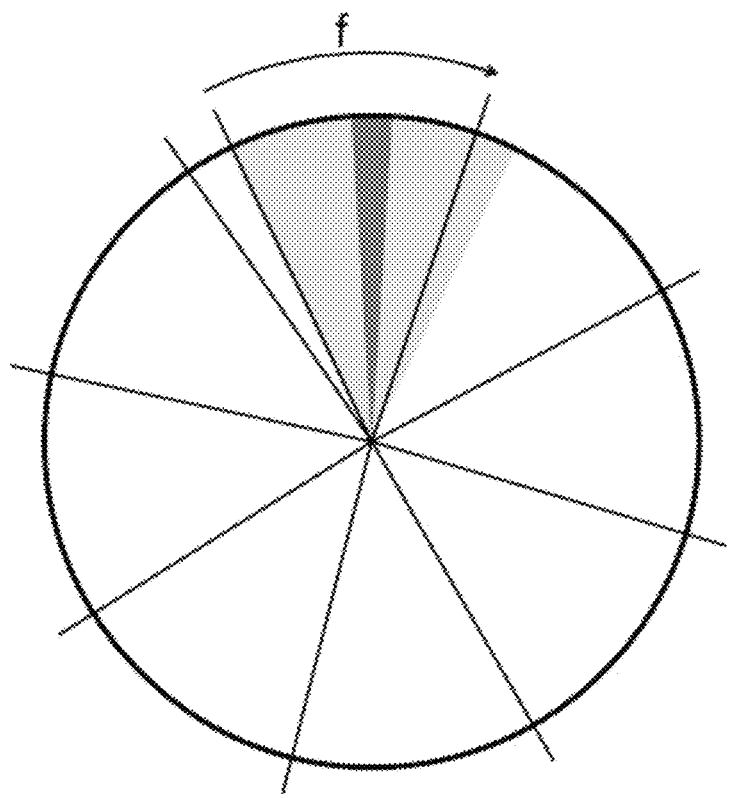

FIG. 17B shows a maximum detection range. For $f_g \leq f < 2d$ a detection occurs every $N=1/f<A/g$ cycles, at least once each time the phase rotates around the unit circle. As long as $2^{-b}<gk/2A$, plesiochronous mode is not entered because the phase bounds will diverge by only $2^{-b}g/2A$ between detections. For example, for the numbers of our example we have $gk/2A=(0.1)(0.5)/(2)(4)=0.00625$, and $b=8$ bits is sufficient precision. Because $f<2d$, the phase cannot "jump over" the detection region and at least one detection is guaranteed to be achieved each time the phase rotates about the unit circle. Because $f \geq f_g$, this rotation will take at most $1/f_g = A/g$ cycles. As shown in the present embodiment, a detection at least every nine cycles.

For $f \geq 2d$ we can represent f as a rational fraction with a bounded denominator plus an error term, $f=N/D \pm e$ where $D \leq C = [½d]$. As described below, the properties of sequences of fractions with bounded denominators, called Farey Sequences, guarantees that $eDC<1$. In this case a repeating pattern of D points are provided around the phase circle that shifts by De each D-cycle period. This gives the same two cases as for $f<2d$.

Figure 17C:
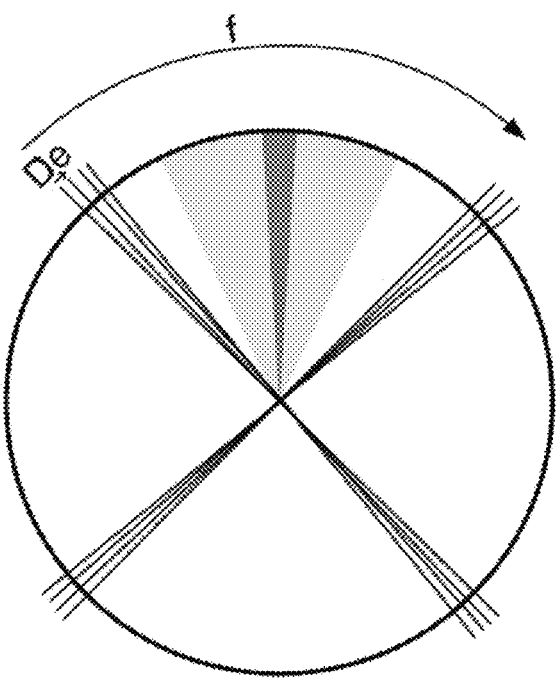

FIG. 17C shows a nearly rational case with D=4 and small residual frequency De. If $De<g/A$, the phase shift each period is small enough that there is detection before error, the same as when $f<g/A$. This is illustrated in the present embodiment for D=4. In fact, the constraint here is a bit easier because D cycles elapses each time one of the phase "groups" advances De, hence there is a detection A cycles before a keep-out event as long as $De<g/[A/D]$ which is a looser constraint.

Figure 17D:
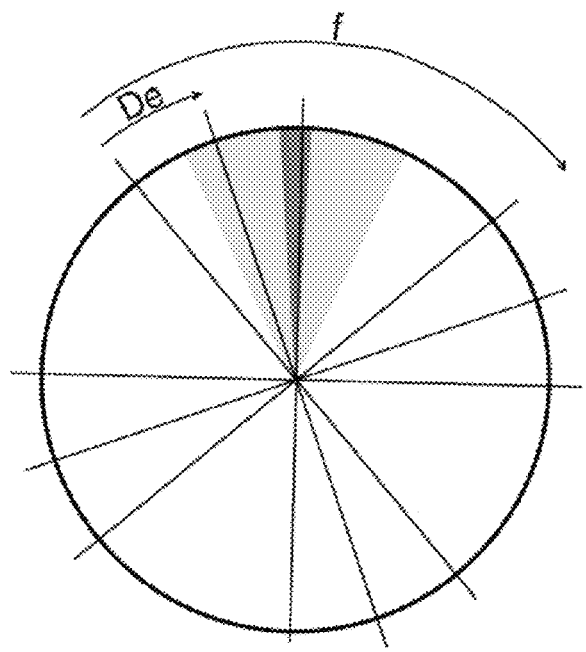

FIG. 17D shows a nearly rational case with D=4 and large residual frequency De. If $g/A \leq De < 2d$, then a detection is achieved every $1/(De)<A/g$ cycles so if $2^{-b}<gk/2A$ a detection will occur before too much error is accumulated. The requirement on b here is exactly the same as in the $g/A \leq f < 2d$ case above.

It can be shown that for $f>2d>1/C$, f can always be represented as $f=N/D \pm e$ with $D \leq C$ and $eDC<1$. Consider the Farey Sequence F(C), the sequence of rational numbers between 0 and 1 with denominators $D \leq C$. For two adjacent numbers from this set, p/q, r/s, it will always be the case that $r/s=(ps+1)/qs$ where q, $s<=C$ and $(ps+1)=qr$ [7]. Then the distance between two adjacent rationals p/q and r/s is 1/qs. We allocate values of f between p/q and p/q+1/q(s+q) to p/q and numbers from $r/s−1/s(s+q)$ to r/s. Then we know $e \leq 1/q(s+q)$, $eDC \leq (1/q(s+q))qC = C/(s+q)<1$, because $s+q>C$ due to the properties of Farey Sequences.

In other embodiments, the two free synchronizer parameters are d and k. Given a keep-out region, 2x, which is a property of the synchronizer flip-flops, choosing d gives the value of the guard band, g=d−x, which in turn determines the number of bits required for the frequency and phase estimates, $2^{-b}<gk/2A$, so $b>lg(2A/gk)$. Choosing a small d, and hence a small guard band gives a more precise phase estimate, and hence reduces synchronizer delay, but at the expense of requiring more bits in the frequency and phase estimators to ensure correct behavior.

Choosing the value of k gives a similar tradeoff. Choosing a small k gives a lower average synchronizer delay, because the synchronizer will enter plesiochronous mode (with no delay) sooner. However choosing a small k also requires more bits of precision in the estimates.

In one exemplary simulation, a Verilog RTL model of the periodic synchronizer described above may be constructed, and two such synchronizers may be used to build a flow-controlled FIFO as described in FIGS. 15-16. The delay lines in the phase detectors may be modeled behaviorally, and all flip-flops can be instrumented with setup- and hold-time checks. Verilog simulations can be performed with one clock fixed at 1 Ghz and the other clock set to 2000 randomly chosen frequencies between 500 Mhz and 2 GHz. In one embodiment, the phase of the 1 Ghz clock is swept slowly back and forth over a range of 1600 ps, changing at a rate of 1 ps every 10 cycles, to ensure that all relative clock phases were tested. No timing errors may be detected during such simulation.

Figure 18:
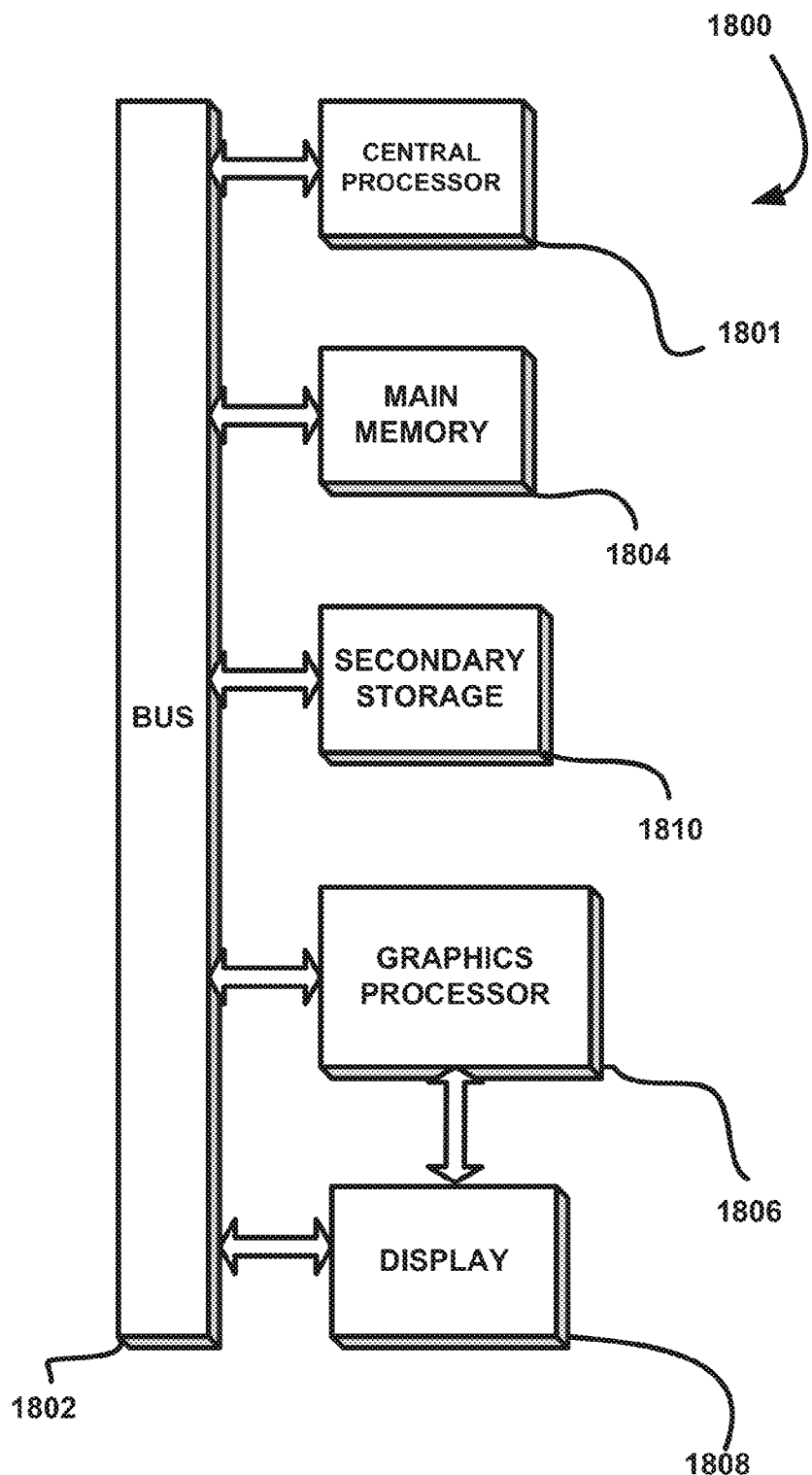
FIG. 18 illustrates an exemplary system in which the various architecture and/or functionality of the various previous embodiments may be implemented.

FIG. 18 illustrates an exemplary system 1800 in which the various architecture and/or functionality of the various previous embodiments may be implemented. As shown, a system 1800 is provided including at least one host processor 1801 which is connected to a communication bus 1802. The system 1800 also includes a main memory 1804. Control logic (software) and data are stored in the main memory 1804 which may take the form of random access memory (RAM).

The system 1800 also includes a graphics processor 1806 and a display 1808, i.e. a computer monitor. In one embodiment, the graphics processor 1806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1800 may also include a secondary storage 1810. The secondary storage 1810 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1804 and/or the secondary storage 1810. Such computer programs, when executed, enable the system 1800 to perform various functions. Memory 1804, storage 1810 and/or any other storage are possible examples of computer-readable media.

In one embodiment, the architecture and/or functionality of the various previous figures may be implemented in the context of the host processor 1801, graphics processor 1806, an integrated circuit (not shown) that is capable of at least a portion of the capabilities of both the host processor 1801 and the graphics processor 1806, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1800 may take the form of a desktop computer, lap-top computer, and/or any other type of logic. Still yet, the system 1800 may take the form of various other devices m including, but not limited to a personal digital assistant (PDA) device, a mobile phone device, a television, etc.

Further, while not shown, the system 1800 may be coupled to a network [e.g. a telecommunications network, local area network (LAN), wireless network, wide area network (WAN) such as the Internet, peer-to-peer network, cable network, etc.) for communication purposes.

As previously explained in conjunction with FIG. 14, when an accurate phase estimate is determined, the system clearly guarantees a safe synchronization. In practice, the receiver uses an estimate of tclk phase, p. To account for the estimation error, $\epsilon=|\phi-p|$ the phase estimate may be computed using interval arithmetic as previously described with respect to FIG. 7 and Table 9, giving a bound on $\epsilon$. When using interval arithmetic, the selection decision between the even or odd register is made using the lower-bound of the transmit phase (lp), since this always selects the most recently written register that is safe to sample. An upper-bound of the transmit phase (up) is also computed.

Table 9 illustrates one example of Verilog code which may be used for updating the upper and lower phase estimate (up and lp, respectively) using the phase detector 540 in FIG. 5E. Of course, it should be noted that the code set forth in Table 9 is for illustrative purposed only, and thus should not be construed as limiting in any manner.

TABLE 9

```
always @(posedge rclk) begin
    up <= det ? {dete, bzeros} + d + (f+1)*(S+1) : pu+f+1 ;
    lp <= det ? {dete, bzeros} - d + (f-1)*(S+1) : pl+f-1 ;
end
```

At the sample time, the transmit phase is known to be $\phi\epsilon$[lp, up], and if lp$\epsilon$[x,1+x) the even register is safe to sample. Otherwise, the odd register is safe to sample. However, when up-lp>1-2x the phase estimation is no longer useful and neither the even nor the odd register is safe to sample. Rather than operating the synchronizer in plesiochronous mode, as previously described, when up-lp>1-2x, the synchronizer is configured to select neither the even nor the odd register and instead maintain the previously selected sample at the output. When a threshold number of rclk cycles have passed without selecting either the even or the odd register, the synchronizer may then operate in plesiochronous mode.

Maintaining the previous sample at the output of the synchronizer instead of transitioning to operate in plesiochronous mode allows the synchronizer to transfer signals between the transmit and receive clock domains with less latency when clock jitter increases for one or more clock cycles producing intermittent errors in the phase estimation. In other words, a previously sampled value that is valid is maintained while the phase estimator recovers from a temporary condition that caused the phase estimates to be inaccurate. The synchronizer may track the number of receive clock cycles for which neither the odd or even register is selected to be sampled. Although the synchronizer is described in terms of an odd register and an even register, additional registers may be included storing signals corresponding to different relative phases relative to the transmit clock.

Figure 19A:
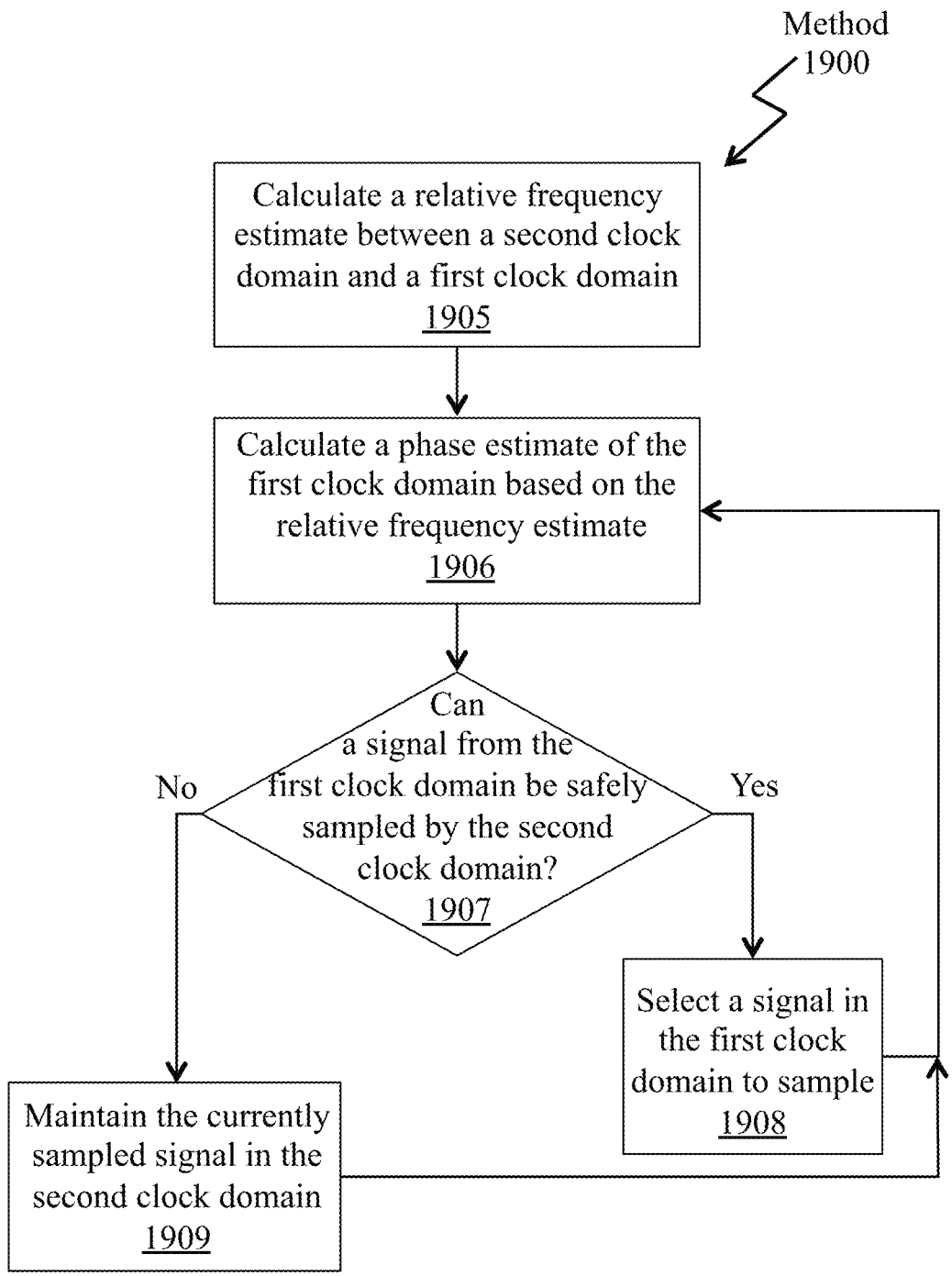
FIG. 19A illustrates method for determining a time for safely sampling a signal of a clock domain using a phase estimate, in accordance with yet another embodiment.

FIG. 19A illustrates method for determining a time for safely sampling a signal of a clock domain using a phase estimate, in accordance with yet another embodiment. As shown in operation 1905, a relative frequency estimate between a second clock domain (tclk) and a first clock domain (rclk) is calculated utilizing a frequency estimator. With respect to the present description, the frequency estimate may be calculated in the manner described above with respect to operation 102 of FIG. 1. The frequency estimator 400 shown in FIG. 4 may be used to calculate the relative frequency estimate f, that indicates the frequency of the transmit clock relative to the receive clock. In an alternate embodiment the relative frequency estimate may be known or determined in some other manner, in which case, the relative frequency estimate is provided at step 1905.

Further, as shown in operation 1906, a phase estimate of the first clock domain is calculated based on the relative frequency estimate, utilizing a phase estimator. In one embodiment, as previously described in conjunction with the phase detectors 500, 510, and 540 and the four-sample phase detector 520, a phase of the first clock domain may be detected using early and late samples may be from the first clock domain relative to the second clock domain.

In another embodiment, the phase estimate may be calculated based on the phase detection. For example, a b-bit running estimate of the phase of the first clock domain may be maintained relative to the second clock domain, as previously described in conjunction with the calibrator 530 that measures the detection interval, d.

In a further embodiment, upon a detection, the phase of the first clock domain should be set to f(S+1), where an additional cycle is added to S (the delay of the synchronizer) to predict the phase estimate one cycle before it occurs. The phase of the first clock domain described above may be set to f(S+1) so that the phase estimate predicts the phase of the first clock domain at a next rising edge of the second clock domain. For example, the phase estimate may encode the phase within even cycles and odd cycles of the first clock domain. If the phase is not detected, the phase estimate may be incremented by the relative frequency of the first clock domain during each cycle of the second clock domain to maintain a running phase estimate.

As shown in operation 1907, a determination is made regarding whether a signal from the first clock domain can be safely sampled by the second clock domain to generate a sampled signal in the second clock domain. When the forward synchronizer 900 is used and up-lp>1-2x, the phase estimation is no longer useful and neither the even nor the odd register is safe to sample. Similarly, when a synchronizer configured to select between multiple registers storing the signal from the first clock domain at different phase offsets is used and up-lp>(N-1)-2x, where N is the number of the multiple registers, the phase estimation is no longer useful.

If, at operation 1907, it is determined, based on the phase estimate, that a time during which a signal from the first clock domain is unchanging such that the signal is capable of being safely sampled by the second clock domain, then, in operation 1908 the signal from the first clock domain is sampled by the second clock domain to generate a sampled signal. After the sampled signal is generated, the method returns to operation 1906 and calculates an updated phase estimate.

Phase estimate p is reset each time the phase detection logic indicates that a transition of the tclk has occurred within a cycle of rlk. Specifically, the phase estimate is reset to [−d,d] and the even bit (msb) is set if an even edge was detected. Then the phase estimate is advanced in time by S+1 cycles. When a transition has not occurred, the phase is incremented by, f, that indicates the relative frequency of tclk each cycle of rclk. The time during which the transmit phase is in the keep-out region can be more accurately detected by maintaining upper and lower bounds on the phase estimate up and lp, as shown in Table 9.

If, at operation 1907, it is determined, based on the phase estimate, that the signal from the first clock domain is changing such that the signal is not capable of being safely sampled by the second clock domain, then at operation 1909, the sampled signal in the second clock domain is maintained. In other words, the signal from the first clock domain is not sampled and the previous sampled signal from the first clock domain that was sampled in the second clock domain is held.

Figure 19B:
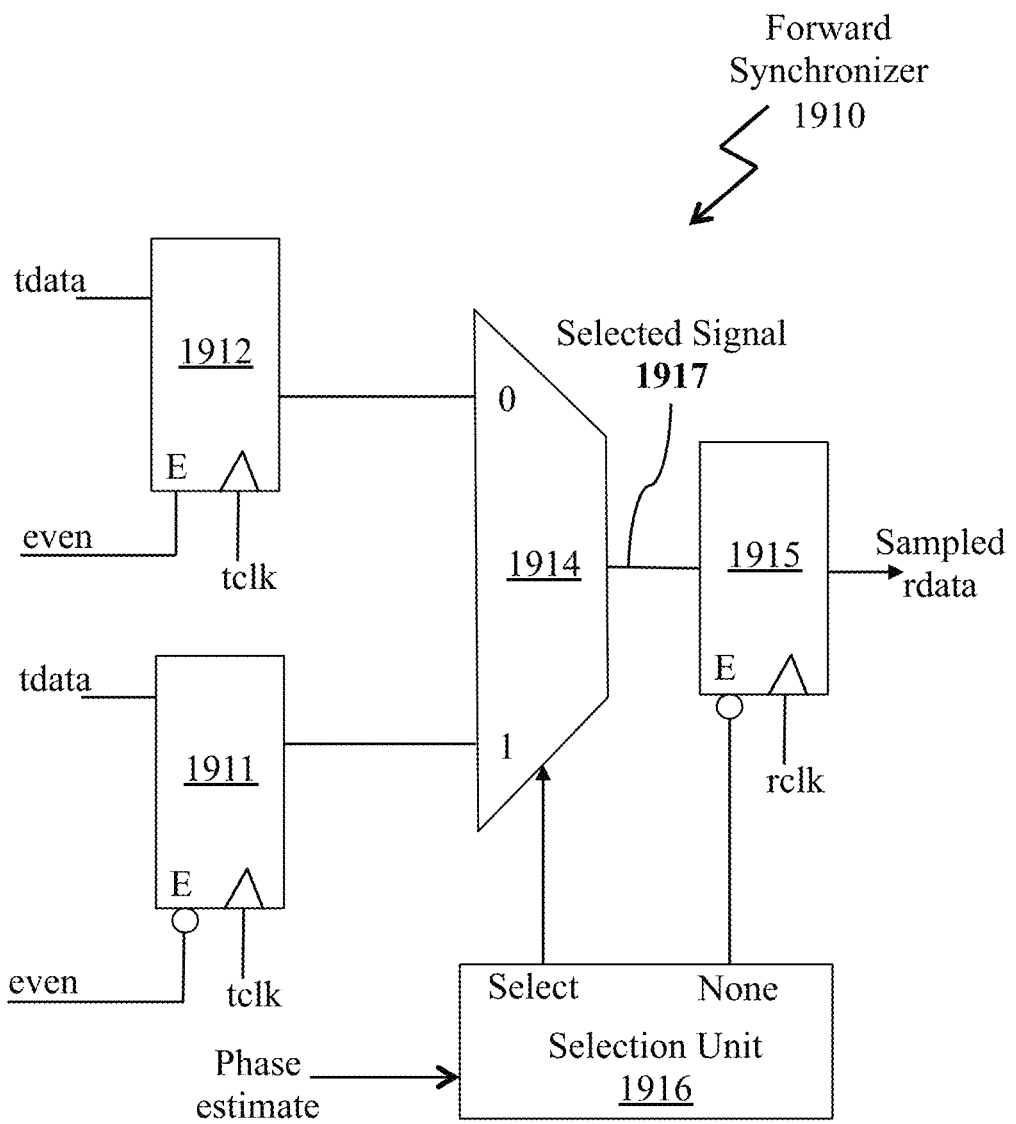
FIG. 19B illustrates a forward synchronizer, in accordance with yet another embodiment.

FIG. 19B illustrates a forward synchronizer 1910, in accordance with yet another embodiment. It should be noted that in addition to a selection unit 1916, a phase detector and a phase estimator may also be included in the forward synchronizer 1910. For example, the forward synchronizer 1910 may be implemented between the system associated with the first clock domain and the system associated with the second clock domain for synchronizing signals between the first clock domain and the second clock domain (e.g. for synchronizing the sampling of the signal by the second clock domain from the first clock domain). As described below, such synchronization may be performed based on the calculated phase estimate.

As an option, the forward synchronizer 1910 may be implemented within the context of the functionality and architecture of FIGS. 1-2 and 4-8. Of course, however, the forward synchronizer 1910 may be implemented in any desired environment. It should also be noted that the aforementioned definitions may apply during the present description.

With respect to the present embodiment, limitations associated with sampling a delayed version of the signal may be avoided. To forward a multi-bit signal from the transmit clock domain to the receive clock domain without flow control, the transmit clock writes a pair of registers on alternate cycles. For example, register 1912 is written on even cycles (updated at the end of the even cycle), and register 1911 is written on odd cycles (updated at the end of the odd cycle). An even input signal enables the register 1912 on even cycles and enables the register 1911 on odd cycles.

The phase estimate is used by the selection unit 1916 to select the most recently written transmit register that is "safe" to sample in the receive clock domain (at the end of the current rclk cycle). The phase estimate may include the lp and up values, and when neither the register 1912 nor register 1911 is "safe" to sample, the selection unit 1916 asserts the "None" output signal and the output register 1915 is not enabled to sample the selected signal. The selection is based on the predicted tclk phase, p, at the end of the current rclk cycle. On each receive clock, register 1911 is selected if the transmit clock phase is between e.x and o.x, where e refers to the even cycle, and x is the "keep out" margin. The register 1912 is selected otherwise. The delay of the forward synchronizer 1910 will vary between 0.x and 1.x depending on phase with an average of 0.5+0.x.

While the present embodiment is described with respect to even and odd clock cycles and two registers, it should be noted that in other embodiments any number of clock cycles and registers may be utilized. Thus, clock cycles can be labeled modulo N and N registers can be employed. Increasing the number of registers allows for very large keep-out regions (e.g. larger than a single UI).

As shown in FIG. 19B, and with respect to the transmitter side, "tdata" is written alternately into the 1912 and 1911 registers on each cycle of "tclk". On the receiver side, the selection unit 1916 determines which of the two registers is selected to output the selected signal 1917. The selection unit 1916 may base this decision on the phase estimate of the transmitter clock generated by the frequency and phase estimation logic (not shown).

Figure 19C:
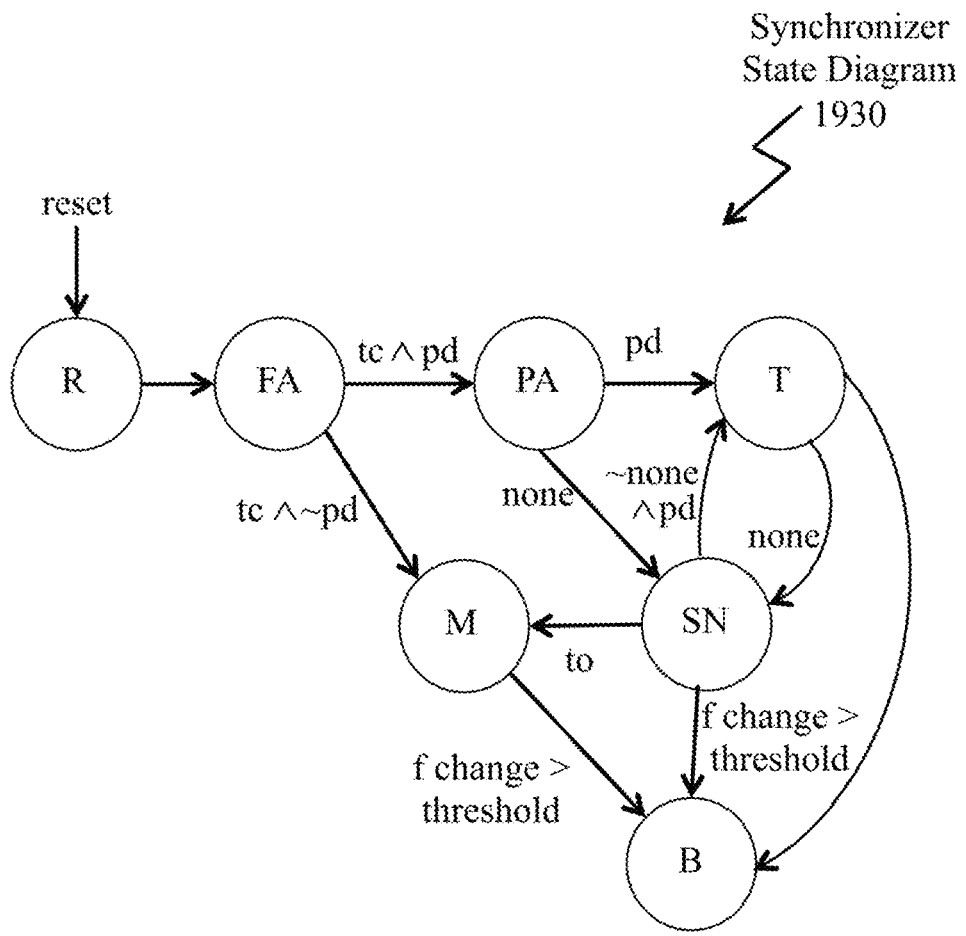
FIG. 19C illustrates a synchronizer state diagram, in accordance with the operation of the forward synchronizer shown in FIG. 19B.

FIG. 19C illustrates a synchronizer state diagram 1930, in accordance with the operation of the forward synchronizer shown in FIG. 19B. Upon initialization, the forward synchronizer 1910 can go through various different states. Table 10 shows the optional states of the forward synchronizer 1910 during initialization. Of course, it should be noted that such states are set forth for illustrative purposes only and thus should not be construed as limiting in any manner.

TABLE 10

| R | Reset | Start frequency measurement process |
|---|---|---|
| FA | Frequency Acquisition | Wait for frequency measurement to complete Record if a phase detection occurs during this period. If no phase detection −> Plesiochronous |
| PA | Phase Acquisition | Wait for phase detection Time out −> Plesiochronous |
| T | Tracking | Track estimated phase Age phase until next detection If up − lp > 1 − 2x −> Select None If frequency changes by more than threshold −> Brute-force |
| SN | Select None | None of the registers are sampled and the previously sampled signal is maintained If phase becomes too old −> Plesiochronous If the signal can be safely sampled −> Tracking If frequency changes by more than threshold −> Brute-Force |
| M | Plesiochronous | Operate in Plesiochronous mode Look for a phase detection If phase detection −> Tracking If frequency changes by more than threshold −> Brute-force |
| B | Brute-force | Resort to using a brute-force synchronizer. Need to see several stable frequency measurements to return to FA. |

As described with respect to FIG. 19C, on reset the forward synchronizer 1910 enters the frequency acquisition (FA) state and starts its pair of counters to measure the frequency of the "other" clock. During while in the FA state, the forward synchronizer 1910 checks to see if there is a phase detection (phase falling into the detection region) after a terminal count is reached and the signal tc is asserted.

Once frequency is acquired, the phase acquisition (PA) state is entered and the forward synchronizer 1910 waits for a phase detection (pd). At this point a frequency estimate, f, and a phase estimate, p, have been determined. If the signal is capable of being safely sampled, none is negated the tracking state (T) is entered. If the signal is not capable of being safely sampled, none is asserted and the select none state (SN) is entered. When in state SN, if there is no phase detection (e.g. a timeout occurs), the two clocks are rationally related (f=N/D) (or nearly rationally related) with a phase offset so that the D hits around the phase circle stay out of the detection region. In this case the M state is entered since the phase precession is guaranteed to be slow enough that it will be detected before an error occurs. When in state SN, if there is a phase detection and none is negated the state T is entered.

In the states T and SN the forward synchronizer 1910 updates the phase estimate each cycle and take appropriate actions when the forward synchronizer 1910 detects that the phase estimate is within a keep out region. The number of cycles since the last phase detection is counted in state SN and when this number exceeds a predetermined value, a signal to is asserted, and the phase estimate is no longer reliable and the forward synchronizer 1910 enters the Plesiochronous (M) state. The number of cycles may be reported to a software driver.

Operation in the T state depends on the frequency being constant or nearly constant. To be safe (e.g. for situations where frequency may change during short periods of time, such as when changing between power states), the frequency measurement circuit may operate continuously and compare its measurement with the current estimate. If a change in a clock frequency is larger than a threshold, the forward synchronizer 1910 may drop back to brute-force mode and enter the brute-force state (B).

The forward synchronizer 1910 may optionally only be used where either the clocks are periodic, or where deviations from periodic behavior are signaled explicitly (e.g. a "not periodic" signal triggers brute-force mode before the clocks start to vary unpredictably). In this way, detection of a frequency change that is too slow, whereby several unsafe samplings between the clock domain are capable of being made before the detection of a change, may be avoided.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    calculating, using a phase estimator, a phase estimate of a first clock domain based on a relative frequency estimate between a second clock domain and the first clock domain at a first point in time;
    determining, based on the phase estimate, a first time during which a signal transmitted from the first clock domain to the second clock domain is unchanging such that the signal is capable of being safely sampled in the second clock domain;
    generating, during the first time, a first sampled signal by sampling the signal in the second clock domain;
    calculating an updated phase estimate of the first clock domain based on the relative frequency estimate between the second clock domain and the first clock domain at a second point in time;
    determining, based on the updated phase estimate, a second time during which the signal from the first clock domain is changing such that the signal is not capable of being safely sampled in the second clock domain; and
    maintaining, during the second time, the first sampled signal.

2. The method of claim 1, wherein the phase estimate is an interval including an upper bound and a lower bound.

3. The method of claim 2, wherein the step of determining the second time comprises determining that a difference between the upper bound and the lower bound exceeds a threshold.

4. The method of claim 1, wherein the phase estimate is incremented during each of a plurality of cycles of the second clock domain.

5. The method of claim 1, wherein the phase estimate encodes a phase within even cycles and odd cycles of the first clock domain.

6. The method of claim 1, further comprising failing to detect a clock edge in the first clock domain during a cycle of the second clock domain, and wherein the calculating of the updated phase estimate comprises incrementing the phase estimate by the relative frequency estimate.

7. The method of claim 1, further comprising detecting a clock edge in the first clock domain during a cycle of the second clock domain, and wherein the calculating of the updated phase estimate comprises setting the phase updated phase estimate equal to a detection interval.

8. The method of claim 1, further comprising incrementing a count of cycles for which the signal is not capable of being safely sampled.

9. The method of claim 8, further comprising:
    determining that the count of cycles exceeds a predetermined value; and
    operating in a plesiochronous mode.

10. The method of claim 1, wherein the phase estimate is computed using interval arithmetic to maintain an accurate error bound on a phase associated with the phase estimate.

11. The method of claim 1, wherein the first clock domain successively writes to a plurality of registers on successive cycles, and wherein the second clock domain uses the phase estimate to select a most recently written register of the plurality of registers that is safe to sample in the second clock domain.

12. The method of claim 11, wherein the plurality of registers comprises only two registers.

13. The method of claim 11, wherein the alternate cycles include an even cycle and an odd cycle, such that a first one of the plurality of registers is written during the even cycle and a second one of the plurality of registers is written during the odd cycle.

14. The method of claim 1, wherein a FIFO synchronizer is realized by using a plurality of even/odd synchronizers to pass a tail pointer into an output clock domain and a head pointer into an input clock domain.

15. The method of claim 14, wherein an even tail pointer, an odd tail pointer, an even head pointer, and an odd head pointer are utilized by:
    computing the even tail pointer on even clock cycles of an input clock and the odd tail pointer on odd clock cycles of the input clock; and
    storing the computed even tail pointer in an even tail register on the even clock cycles of the input clock and the computed odd tail pointer in an odd tail register on the odd clock cycles of the input clock.

16. The method of claim 1, further comprising calculating the relative frequency estimate utilizing a frequency estimator that comprises a pair of counters configured to calculate the relative frequency estimate as a frequency of the first clock domain relative to a frequency of a second clock domain.

17. A system, comprising:
    a phase estimator configured to:
        calculate a phase estimate of the first clock domain based on a relative frequency estimate between a second clock domain and the first clock domain at a first point in time, and
        calculate, for each cycle in the second clock domain, an updated phase estimate of the first clock domain based on the relative frequency estimate between the second clock domain and the first clock domain at a second point in time; and a synchronizer that is coupled to the phase estimator and configured to:

determine, based on the phase estimate, a first time during which a signal transmitted from the first clock domain to the second clock domain is unchanging such that the signal is capable of being safely sampled in the second clock domain, generate, during the first time, a first sampled signal by sampling the signal in the second clock domain, determine, based on the updated phase estimate, a second time during which the signal from the first clock domain is changing such that the signal is not capable of being safely sampled in the second clock domain, and maintain, during the second time, the first sampled signal.

18. The system of claim 17, wherein the phase estimate is an interval including an upper bound and a lower bound.

19. The system of claim 17, wherein the phase estimate is incremented during each of a plurality of cycles of the second clock domain.

20. The system of claim 17, further comprising a frequency estimator comprising a pair of counters configured to calculate the relative frequency estimate as a frequency of the first clock domain relative to a frequency of a second clock domain.

* * * * *